(12) United States Patent
Sugimoto et al.

(10) Patent No.: US 6,851,947 B2
(45) Date of Patent: Feb. 8, 2005

(54) HYDROGEN COMBUSTION HEATER

(75) Inventors: Tamotsu Sugimoto, Tochigi (JP); Shigeho Shimada, Tochigi (JP)

(73) Assignee: Calsonic Kanei Corporation, Tokyo (JP)

( * ) Notice: Subject to any disclaimer, the term of this patent is extended or adjusted under 35 U.S.C. 154(b) by 97 days.

(21) Appl. No.: 09/924,941

(22) Filed: Aug. 9, 2001

(65) Prior Publication Data

US 2003/0031971 A1 Feb. 13, 2003

(30) Foreign Application Priority Data

| Aug. 9, 2000 | (JP) | ......................... | 2000-240816 |
| Jun. 12, 2001 | (JP) | ......................... | 2001-177578 |
| Jun. 13, 2001 | (JP) | ......................... | 2001-178589 |

(51) Int. Cl.[7] ............................................. F23D 14/18
(52) U.S. Cl. ........................................... 431/7; 431/328
(58) Field of Search .......................... 431/7, 268, 328; 60/723; 122/40, 52; 165/158

(56) References Cited

U.S. PATENT DOCUMENTS

| 3,580,225 A | * | 5/1971 | Coy | ............................ | 165/158 |
| 4,459,126 A | * | 7/1984 | Krill et al. | ...................... | 431/7 |
| 5,938,427 A | * | 8/1999 | Suzuki et al. | ............... | 431/268 |

FOREIGN PATENT DOCUMENTS

| DE | 42 02 107 | 7/1993 | |
| DE | 195 44 417 | 6/1997 | |
| EP | 0 798 512 | 10/1997 | |
| EP | 0 846 911 | 6/1998 | |
| GB | 2 268 694 | 1/1994 | |
| JP | 57-210207 A | * 12/1982 | ................. 431/268 |
| JP | 2000-291917 | 10/2000 | |
| WO | 98/01702 | 1/1998 | |
| WO | 99/13269 | 3/1999 | |
| WO | 99/20947 | 4/1999 | |

OTHER PUBLICATIONS

*Handbook of Chemistry and Physics*, 84th ed. [online], CRC Press, 2004. [retrieved on Mar. 25, 2004]. Retrieved from the internet: <URL: http://www.hbcpnetbase.com/> p. 14–19.*

* cited by examiner

Primary Examiner—Sara Clarke
(74) Attorney, Agent, or Firm—Foley & Lardner LLP

(57) ABSTRACT

The invention relates to a hydrogen combustion heater. This heater includes (a) a passage for allowing hydrogen gas and air to flow therethrough; (b) a first catalyst provided in the passage, the first catalyst being heated, when electricity is applied thereto, thereby starting a first combustion of a first mixture of the hydrogen gas and the air in the first catalyst; and (c) a heat exchanger provided downstream of the first catalyst in the passage, the heat exchanger being adapted to transfer heat generated by the first combustion to a heating medium of the heat exchanger.

3 Claims, 25 Drawing Sheets

HYDROGEN

HYDROGEN

HYDROGEN COMBUSTION HEATER

BACKGROUND OF THE INVENTION

The present invention relates to a hydrogen combustion heater for heating a fluid (e.g., water) by a heat generated by a catalytic oxidation of hydrogen gas.

There are various combustion heaters in which a fluid is heated through a heat exchanger by a heat generated by a catalytic oxidation of a fuel gas. It is preferable to use a hydrogen combustion heater, for example, for heating of interior of an electric vehicle equipped with a hydrogen fuel cell, since a single fuel source (i.e., hydrogen gas) can be used for both of the heater and the fuel cell.

A hydrogen combustion heater is operated by bringing a mixture of hydrogen gas and air into contact with a catalyst to achieve a catalytic oxidation of hydrogen gas. It is necessary to get a suitable temperature for achieving the catalytic oxidation. Upon starting the operation of a hydrogen combustion heater, it is known to conduct a spark ignition of a mixture of hydrogen gas and air at a position upstream of the catalyst in the heater, thereby achieving a high temperature and the subsequent combustion of the hydrogen gas. Thus, it becomes possible to heat the catalyst to a temperature suitable for the catalytic oxidation by passing the resulting combustion gas of high temperature through the catalyst.

The above-mentioned spark ignition, however, can be achieved, if the mixing ratio of hydrogen and air is a value causing explosion or deflagration. Besides such explosion problem, the combustion temperature caused by the spark ignition may become too high. This may cause a high thermal stress on a heat exchanger of the heater due to a large temperature difference between the heat exchanger and its fluid. Furthermore, the formation of nitrogen oxides may become too much.

Japanese Patent Unexamined Publication JP-A-2000-291917 discloses a hydrogen combustion device. This device includes a separate heater for preheating a catalyst used in a catalytic oxidation of hydrogen gas.

SUMMARY OF THE INVENTION

It is an object of the present invention to provide a hydrogen combustion heater that is simple in construction and stable in heating capability.

According to the present invention, there is provided a hydrogen combustion heater comprising (a) a passage for allowing hydrogen gas and air to flow therethrough; (b) a first catalyst provided in said passage, said first catalyst being heated, when electricity is applied thereto, thereby starting a first combustion of a first mixture of said hydrogen gas and said air in said first catalyst; and (c) a heat exchanger provided downstream of said first catalyst in said passage, said heat exchanger being adapted to transfer heat generated by said first combustion to a heating medium of said heat exchanger.

DESCRIPTION OF THE PREFERRED EMBODIMENTS

The above-mentioned first combustion of the present invention can be limited to a mild oxidation, which is defined as being a oxidation free from firing of the hydrogen, by controlling the flow rate ratio of the air to the hydrogen. With this, it becomes possible to avoid explosion or deflagration and an excessively high combustion temperature. The flow rate ratio is preferably greater than 8:1, more preferably about 15.3:1, as will be described in detail hereinafter.

Figure 1:
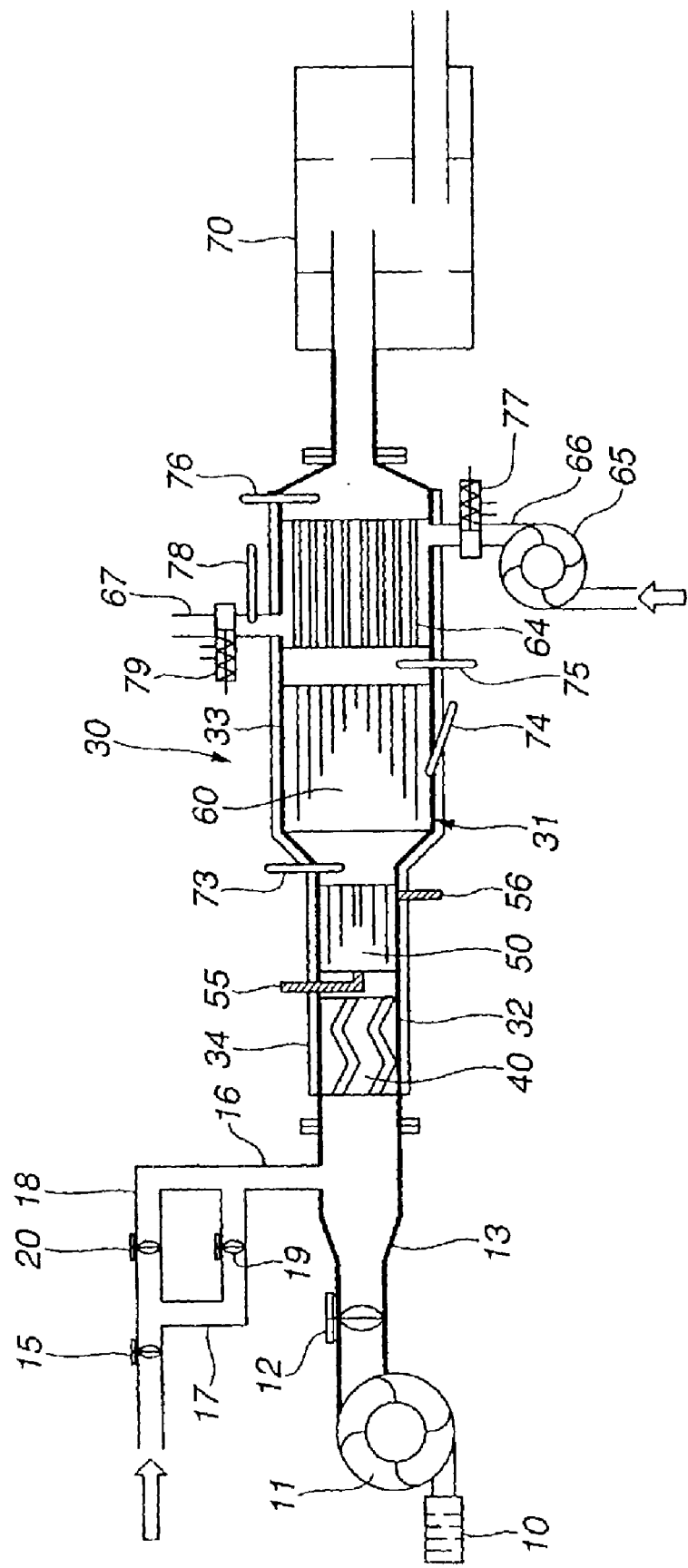
FIG. 1 is a schematic sectional view showing a first hydrogen combustion heater according to a first preferred embodiment of the present invention.

FIG. 1 shows a first hydrogen combustion heater according to a first preferred embodiment of the present invention. The first heater has a passage 13 for allowing hydrogen gas and air to flow therethrough. The passage 13 is formed at its upstream end with a blower 11. Air is sucked by the blower 11 into the passage 13 through a filter 10 and a flow rate regulating valve 12. The passage 13 (inner diameter: 58 mm) is formed on its sidewall with a hydrogen introducing pipe 16 (inner diameter: 8 mm), which is connected to a hydrogen reservoir (not shown) via a pressure reducing valve 15. The hydrogen introducing pipe 16 has a first hydrogen passage 17 provided with a first valve 19 and a second hydrogen passage 18 provided with a second valve 20. It is possible to adjust a hydrogen gas flow rate ratio of a first flow through the first hydrogen passage 17 to a second flow through the second hydrogen passage 18 to 1:9 by controlling the first and second valves 19 and 20. In fact, it is possible to supply hydrogen gas at a flow rate of 5 liters/min to the passage 13 by reducing its pressure with the pressure reducing valve 15 and by opening only the first valve 19. Then, it is possible to supply hydrogen gas at a total flow rate of 50 liters/min to the passage 13 by further opening the second valve 20, too. In other words, it is possible to provide a hydrogen gas flow rate for the initial stage of the hydrogen combustion operation by opening only the first valve 19. Furthermore, it is possible to provide a hydrogen gas flow rate for the steady state operation by opening both the first and second valves 19 and 20. Thus, it is easy to control the fuel flow rate. The passage 13 is connected at its downstream end with a heater unit 30.

In the first hydrogen combustion heater, a fuel supplying means for supplying or introducing hydrogen gas and air can be defined as being formed of the blower 11, the flow rate regulating valve 12, the pressure reducing valve 15, the hydrogen introducing pipe 16, the first and second valves 19 and 20, and the passage 13.

The heater unit 30 comprises a casing 31 that is made of stainless steel and covered with a heat insulating material 34. This casing 31 constitutes a passage of the first hydrogen combustion heater and is formed of (a) a smaller diameter portion 32 having the same diameter as that of the passage 13 and b) a larger diameter portion 33 (inner diameter: 102 mm). A mixer 40 and a first catalyst (electric heating catalyst) 50 are disposed in the smaller diameter portion 32. In fact, the mixer is provided at a position upstream of the electric heating catalyst 50. Therefore, hydrogen gas and air can sufficiently be mixed together before entering into the electric heating catalyst. With this, it is possible to prevent the heat spot generation in the electric heating catalyst, thereby improving durability of the first hydrogen combustion heater. A second catalyst (combustion catalyst) 60 and a heat exchanger 64 are disposed in the larger diameter portion 33. In other words, the combustion catalyst 60 is larger in sectional area than the electric heating catalyst 50. With this, the axial length of the heater unit 30 can be shortened, thereby making the hydrogen combustion heater compact in size.

The electric heating catalyst is smaller than the combustion catalyst in volume, as shown in FIG. 1. A first flow rate of a mixture of hydrogen gas and air for starting a first hydrogen combustion in the electric heating catalyst is adjusted to about $Q_1$ defined by the following expression:

$$Q_1 = Q_s \times V_1/(V_1 + V_2)$$

where $Q_s$ is a flow rate of a mixture of hydrogen gas and air under the steady state operation of the hydrogen combustion heater for conducting a second combustion in both the electric heating catalyst and the combustion catalyst, $V_1$ is a volume of the electric heating catalyst, and $V_2$ is a volume of the combustion catalyst. At the initial stage of hydrogen combustion, a mixture of hydrogen gas and air is introduced at a relatively low flow rate ($Q_1$) that is enough for making an initial catalytic reaction (hydrogen combustion) possible only in the electric heating catalyst of a relatively small volume ($V_1$). With this, it is possible to start the initial catalytic reaction (i.e., a hydrogen combustion in the electric heating catalyst) in a relatively short time with a low electric power. Thus, it is also possible to start the steady state operation (i.e., a hydrogen combustion in the electric heating and combustion catalysts) in a relatively short time.

First and second terminals 55 and 56 extend outward from the electric heating catalyst through the casing 31. The heat exchanger 64 communicates with a water introducing pipe a 66, which is connected with a water pump 65, and a water discharge pipe 67. The larger diameter portion 33 of the casing 31 is tapered at its downstream end into an outlet connected with a muffler 70.

Air supplied into the passage 13 by the blower 11 and hydrogen gas from the hydrogen introducing pipe 16 are uniformly mixed together in the mixer 40 into a gas mixture. Then, the gas mixture is heated and subjected to a combustion in the electric heating catalyst 50. Heat of this combustion can heat the combustion catalyst 60 up to a temperature enough for conducting a catalytic reaction in the combustion catalyst 60. It is, however, possible to omit the combustion catalyst 60 in the invention, as will be described hereinafter in the fourth preferred embodiment shown in FIG. 26. The heated combustion gas (i.e., air) after the oxidation in the combustion catalyst 60 can heat a heating medium (e.g., pure water), and then is discharged from the muffler 70 to the outside.

There is a temperature sensor 73 in a space between the electric heating catalyst 50 and the combustion catalyst 60 for measuring temperature of the combustion gas coming from the electric heating catalyst 50. Furthermore, there are a temperature sensor 74 for measuring temperature of the combustion catalyst 60, and a temperature sensor 75 in a space between the combustion catalyst 60 and the heat exchanger 64 for measuring temperature of the combustion gas coming from the combustion catalyst 60. Still furthermore, there is a temperature sensor 76 immediately downstream of the heat exchanger 70 for measuring temperature of the combustion gas after the heat exchange. There are a pressure sensor 77 at an inlet of the heat exchanger 64, and a temperature sensor 78 for measuring temperature of water after the heat exchange, and a relief valve 79 at an outlet of the heat exchanger 64. The blower 11, the water pump 65, the valves 12, 15, 19, 20 and 79, and the sensors 73–78 are connected to and controlled by a controller (not shown).

Figure 2:
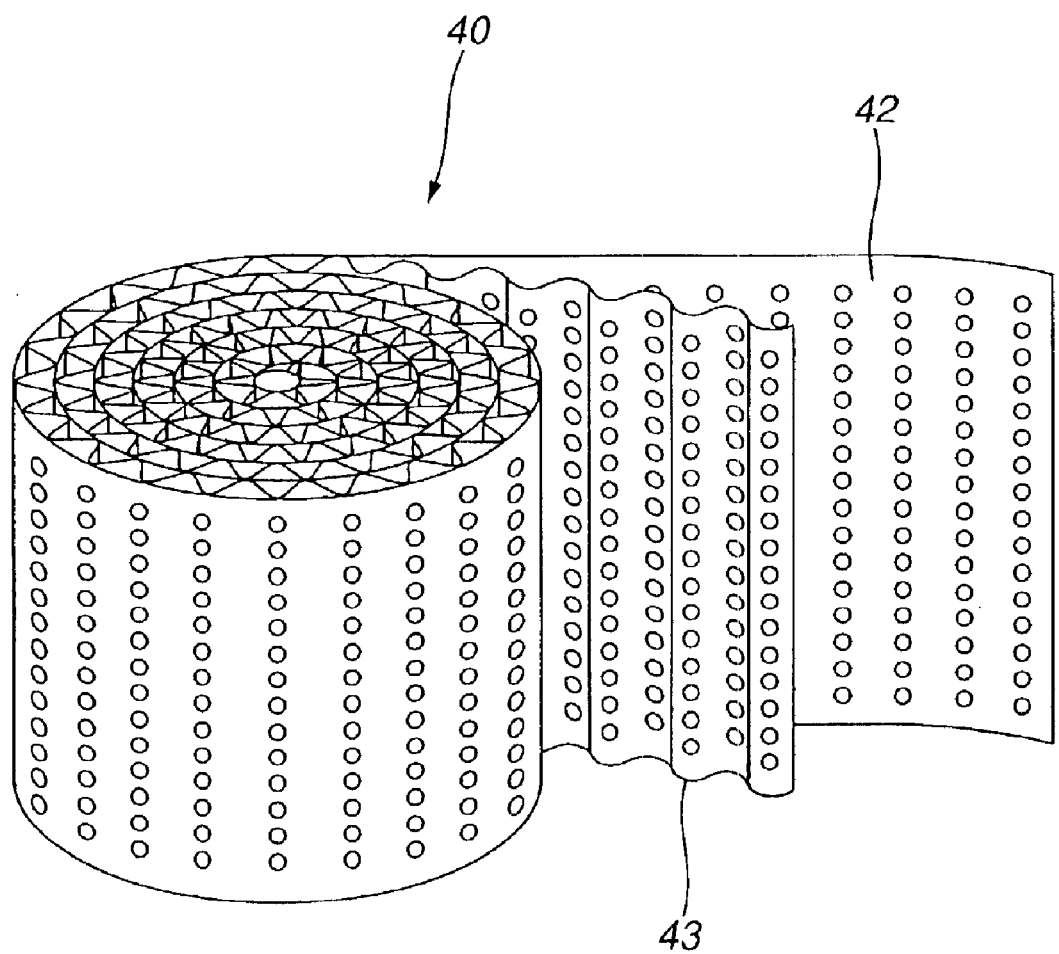
FIG. 2 is a perspective view showing a mixer used in a hydrogen combustion heater according to the present invention.
Figure 3A:
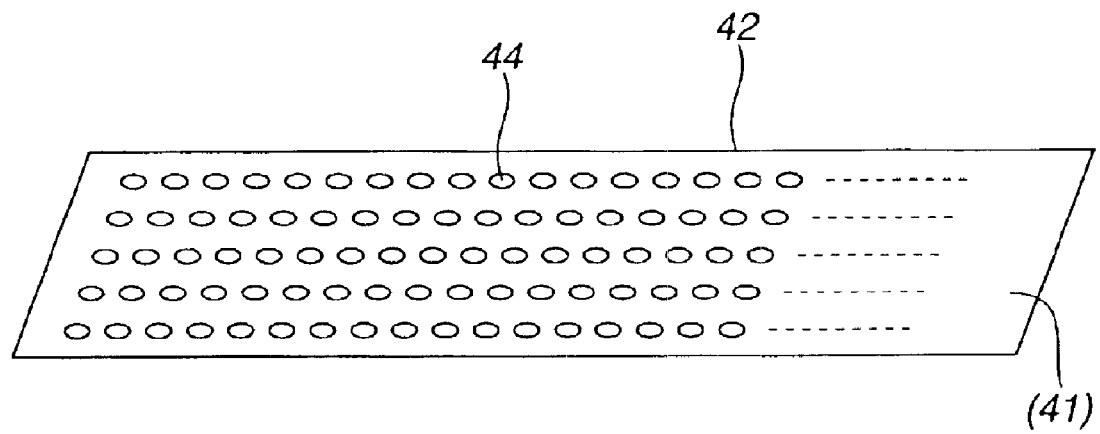
FIGS. 3A and 3B are perspective views respectively showing a flat sheet and a corrugated sheet, which are used for preparing the mixer.
Figure 3B:
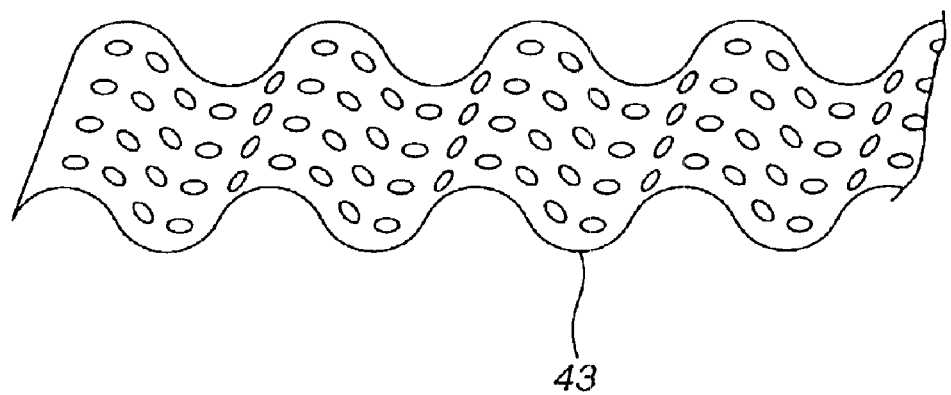
Figure 4A:
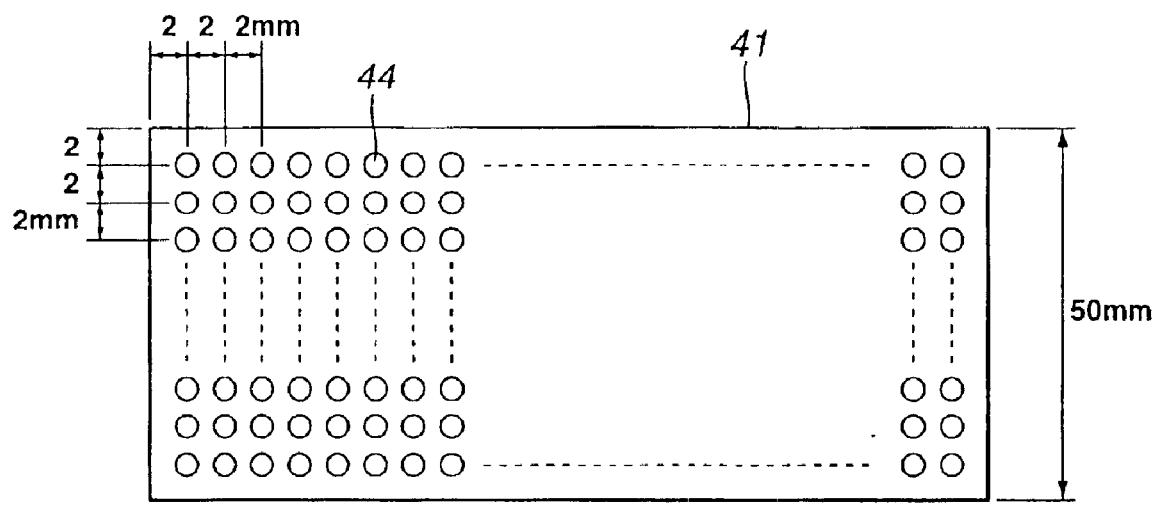
FIG. 4A is a plan view of the flat sheet.
Figure 4B:
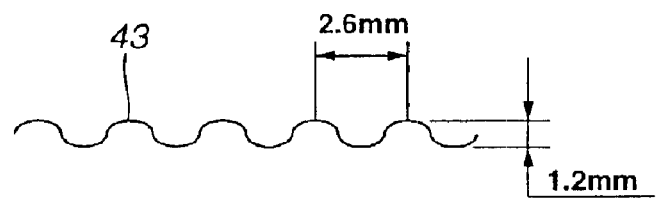
FIG. 4B is a partial side view of the corrugated sheet.

FIG. 2 shows a structure of the mixer 40, which is prepared by winding a laminate of a flat sheet 42 (41) with holes 44 (see FIG. 3A) and a corrugated sheet 43 with holes (see FIG. 3B). As shown in FIG. 4A, the flat sheet 41 is an aluminum sheet (foil) having a width of 50 mm and a thickness of 50 $\mu$m. This sheet has on its entire surface a plurality of holes 44 (diameter: 1.0 mm) at a pitch of 2 mm in the orthogonal directions along its major sides. As shown in FIG. 4B, the corrugated sheet 43 has a plurality of waves (height: 1.2 mm; pitch: 2.6 mm). In FIGS. 2, 3A, 3B, 4A and 4B, the size and the pitch of the holes 44 are enlarged for easiness to understand the structure. A wound body of the flat sheet 42 and the corrugated sheet 43 is subjected to a vacuum heating treatment at 1,200° C. wider a pressure of about 1 Pa for about 20 min, thereby making a mixer with a high rigidity through diffusion bonding. Instead of the vacuum heating treatment, it is possible to easily make a mixer by conducting a spot welding during and after a winding of the flat and corrugated sheets 42 and 43. The mixer 40 is disposed in the smaller diameter portion 32 of the heater unit 30 in a manner to align the axis of the mixer 40 with that of the smaller diameter portion 32. The mixer 40 is provided with a plurality of cells each being defined between the flat sheet 42 and the corrugated sheet 43. Each cell extends between the upstream and downstream ends of the mixer 40 in the axial direction of the smaller diameter portion 32.

Figure 5:
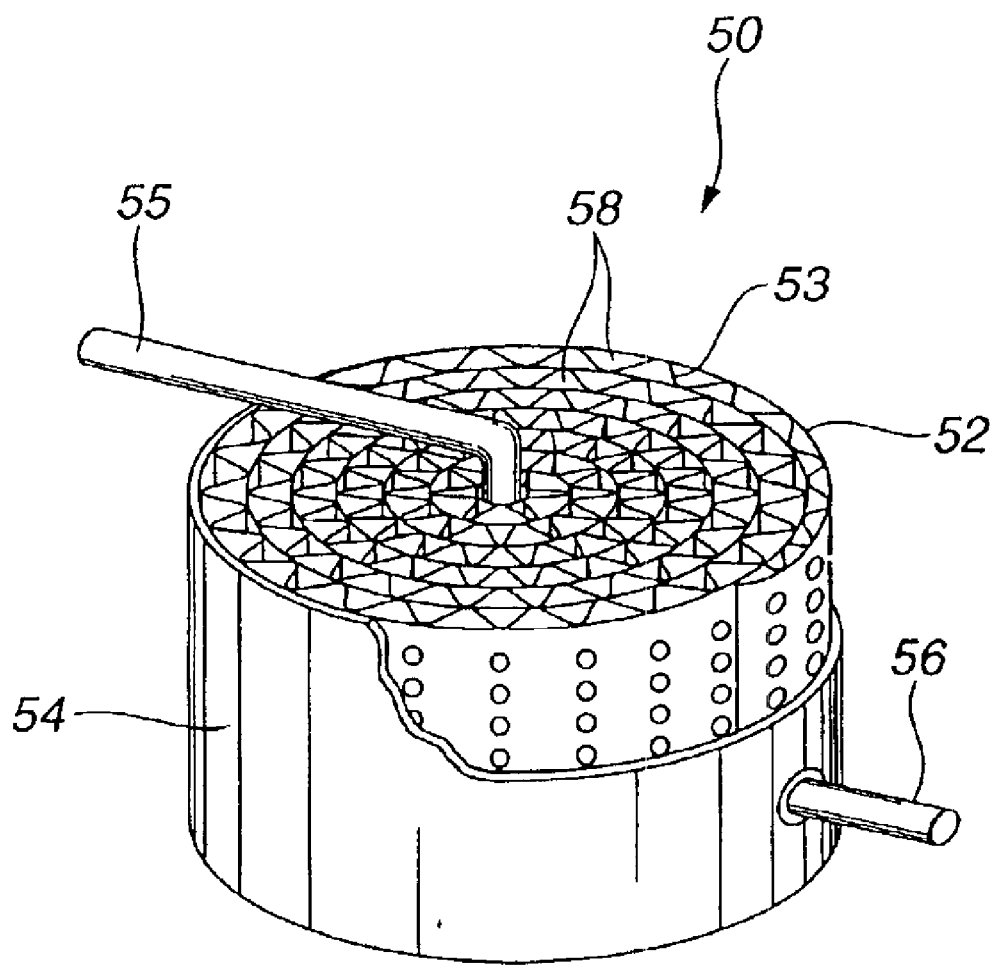
FIG. 5 is a perspective view showing a first catalyst (electric heating catalyst) of the hydrogen combustion heater.

FIG. 5 shows an exemplary structure of the electric heating catalyst 50. This catalyst 50 may be prepared by winding 20 times (20 windings) a laminate of a flat sheet 52 and a corrugated sheet 53, then by brazing a plurality of spots of the wound body, and then pressing the wound body into an outer cylinder 54. This brazing may be replaced with a bonding with a ceramic bond. Each of the flat and corrugated sheets 52 and 53 supports thereon a catalyst component containing 1% platinum and the remainder of alumina ($Al_2O_3$). The electric heating catalyst 50 is electrically connected at its center and its periphery with first and second electrodes 55 and 56, respectively. Such electric heating catalyst can easily be produced with a low cost. The electric heating catalyst is similar in structure to common automotive catalysts (catalytic converters) for purifying exhaust gas.

Figure 6A:
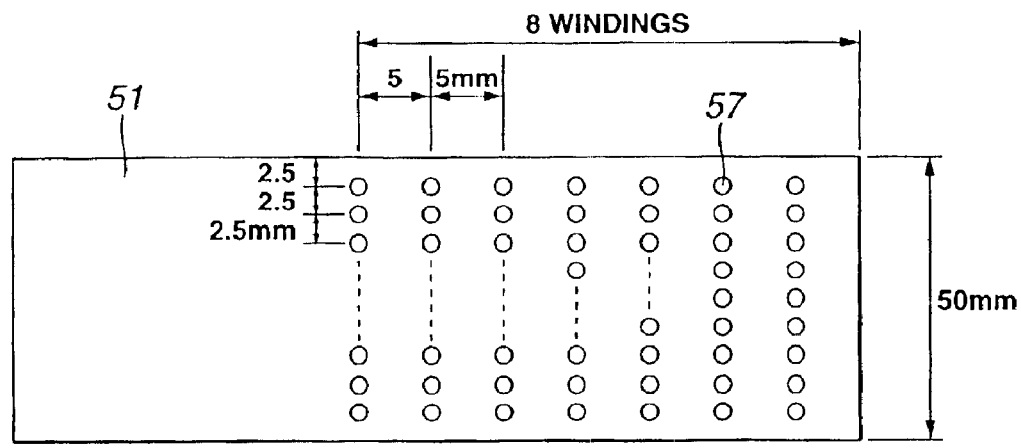
FIG. 6A is a plan view showing a flat sheet of the electric heating catalyst.
Figure 6B:
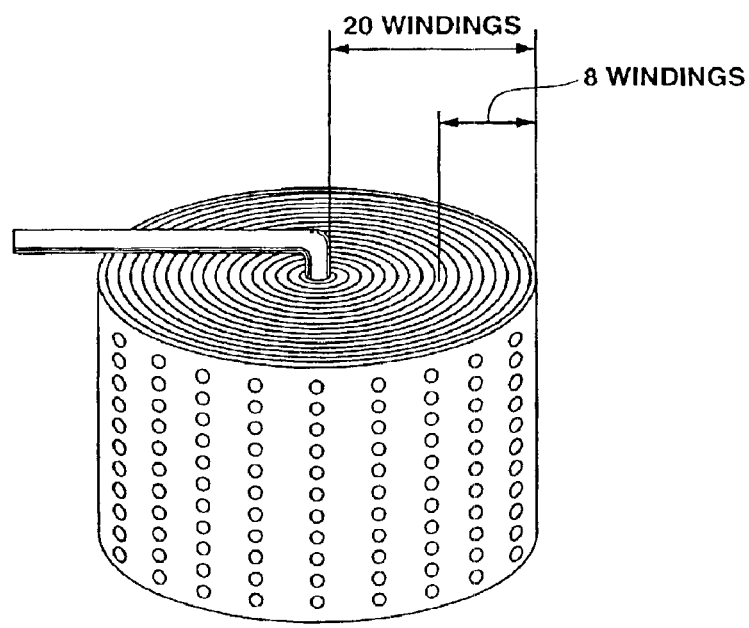
FIG. 6B is another perspective view of the electric heating catalyst.
Figure 6C:
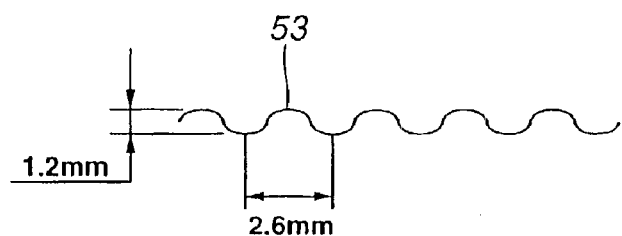
FIG. 6C is a partial side view of a corrugated sheet of the electric heating catalyst.

As shown in FIG. 6A, a raw material (blank) 51 of the flat and corrugated sheets 52 and 53 is a stainless steel sheet containing 20% Cr, 5% Al and the remainder of Fe and having a width of 50 mm and a thickness of 50 $\mu$m. This stainless steel sheet is subjected to a surface oxidation by heating the same at 1,200° C. for about 20 min in the atmosphere. This stainless steel sheet has a plurality of holes 57 (diameter: 1.0 mm) to an extent corresponding to the outermost eight windings of the resulting electric heating catalyst 50 having 20 windings in total (see FIG. 6B). The holes 57 are arranged to have nineteen holes in a direction along the width at a pitch of 2.5 mm. The holes 57 are further arranged in the winding or longitudinal direction at a pitch of 5 mm. The corrugated sheet 53 is configured to have a wave height of 1.2 mm and a wave pitch of 2.6 mm. In FIGS. 5, 6A and 6B, the size and the pitch of the holes 57 are enlarged for easiness to understand the structure.

Figure 7A:
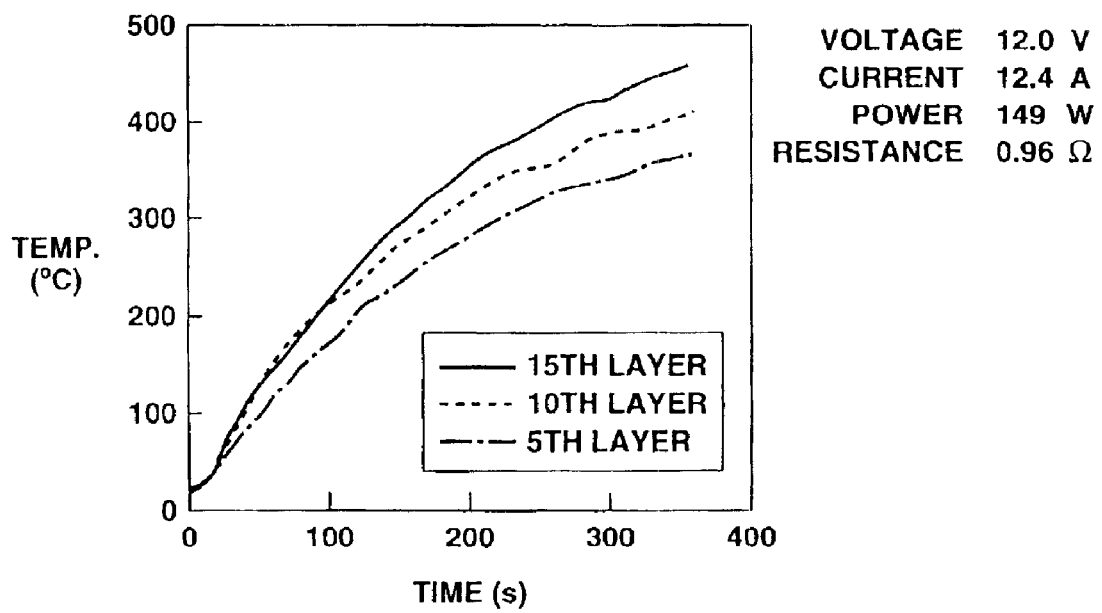
FIGS. 7A and 7B are graphs showing temperature rising characteristics of the electric heating catalyst with heating time.

FIG. 7A is a graph showing temperature rising characteristics of the electric heating catalyst 50 (having 20 layers or windings in total) prepared by winding together the flat sheet 52 and the corrugated sheet 53 each provided at its outermost eight windings with the above-mentioned holes 57. Due to the provision of the holes 57, it is possible to increase the electric resistance of the outermost eight layers. Therefore, it is possible to increase heat generation and the temperature of the outermost eight layers by applying the electricity, even though the outer layers temperature tends to lower by heat radiation. With this, it is possible to suitably proceed the catalytic reaction (hydrogen combustion) in the electric heating catalyst and to start the steady state operation early. In fact, a power (voltage: 12.0V; current: 12.4A) of 149 W was applied to the electric heating catalyst 50 for a period of time shown in FIG. 7A for heating the same. The temperatures of the 5th, 10th and 15th layers (counted from the outermost layer) were measured during this heating.

Figure 7B:
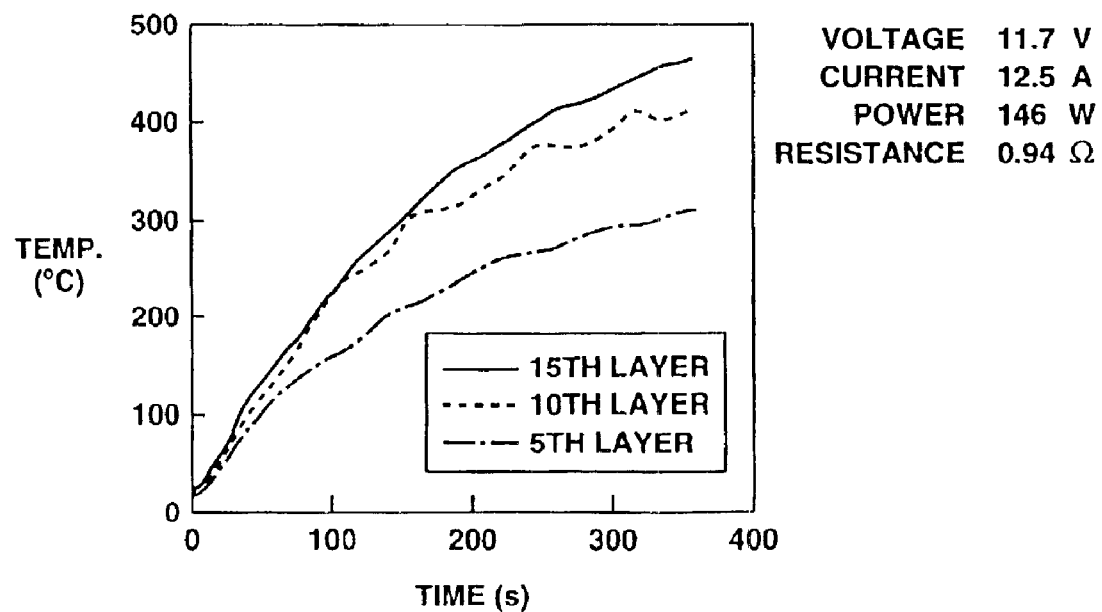

In contrast with FIG. 7A, FIG. 7B is a graph showing temperature rising characteristics of a similar electric heating catalyst (having 20 layers or windings in total) prepared by winding together flat and corrugated sheets each provided with no holes. It is understood from FIG. 7A that the temperature of the 5th layer is not so low relative to those of the 10th and 15th layers, due to the provision of the holes 57. In contrast, it is understood from FIG. 7B that the temperature of the 5th layer is quite low relative to those of the 10th and 15th layers, due to heat radiation. In this case, the catalytic reaction may become insufficient.

Figure 8:
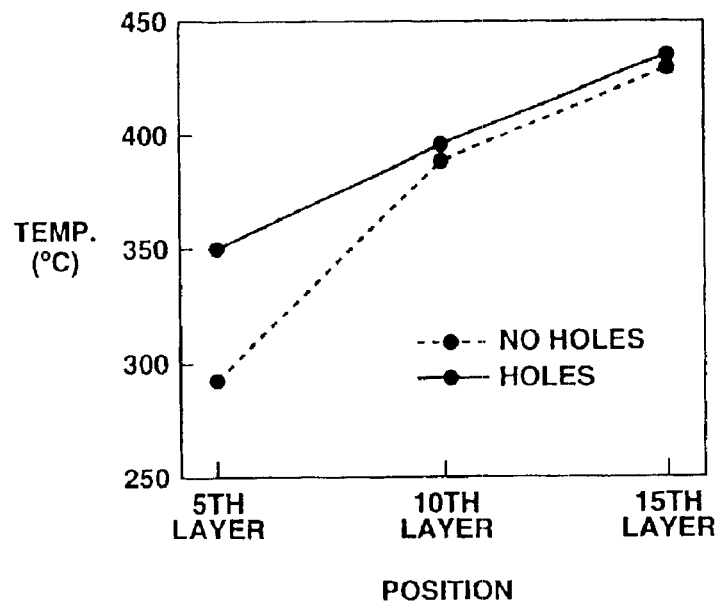
FIG. 8 is a graph showing temperature characteristics of the electric heating catalyst with and without holes.

FIG. 8 also shows temperature characteristics of the electric heating catalyst 50 with the holes 57 and another catalyst with no holes, after the electricity was applied for 300 seconds. It is understood from FIG. 8 that it is possible to increase the temperature of the 5th layer by about 60° C. by providing the holes 57.

The combustion catalyst 60, which is optionally provided in the invention, has a catalyst component (1% platinum and the remainder of alumina) in an amount of 200 g per liter of the catalyst. The combustion catalyst 60 (axial length: 120 mm) is disposed in the larger diameter portion 33 (inner diameter: 102 mm) of the heater unit 30.

The heat exchanger 70 is a multi-pipe heat exchanger of stainless steel having a diameter of 102 mm, an axial length of 150 mm and a heat exchange capacity of 5 kW.

Figure 9:
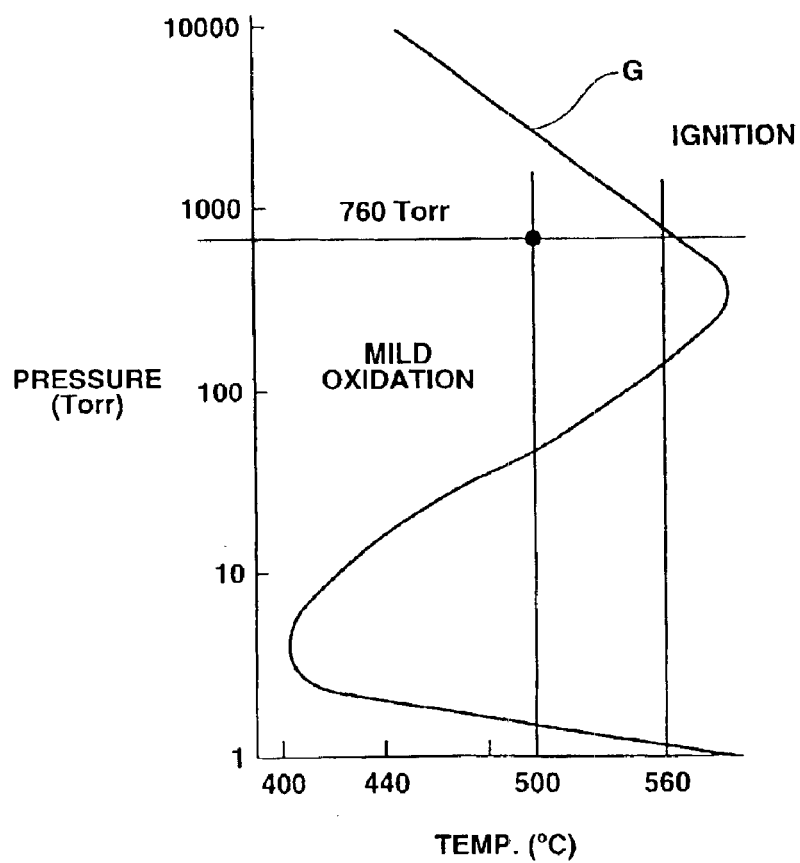
FIG. 9 is a graph showing a hydrogen combustion characteristic.

FIG. 9 shows a hydrogen combustion characteristic. It is understood from FIG. 9 that hydrogen is subjected to a mild oxidation in a temperature region lower than a critical line G and that hydrogen is subjected to firing or ignition in a temperature region higher than the critical line G. This mild oxidation can be defined as being an oxidation free of firing or ignition of hydrogen. It is preferable to provide a temperature as high as possible for efficiently achieving hydrogen combustion. It is, however, understood from FIG. 9 that hydrogen ignition, in place of its mild oxidation, occurs at a temperature higher than about 560° C. under atmospheric pressure (760 Torr). Therefore, it is possible to set the a hydrogen combustion temperature of the invention at 500° C. in order to avoid hydrogen firing or ignition. It should be noted that hydrogen combustion in the electric heating catalyst or the combustion catalyst is conducted in the vicinity of atmospheric pressure (760 Torr).

Figure 10:
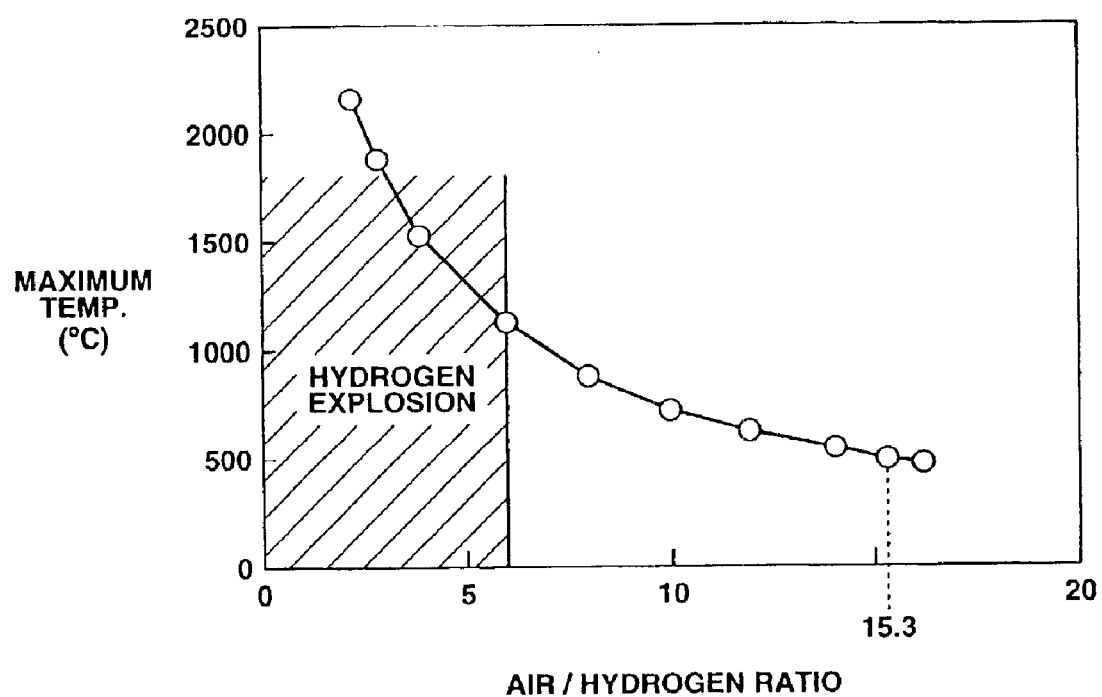
FIG. 10 is a graph showing a relationship between the maximum combustion temperature and the mixing ratio of air to hydrogen gas.

As shown in FIG. 10, the maximum combustion temperature of a mixture of hydrogen and air changes depending on their mixing ratio. It is preferable in the invention to provide an air/hydrogen ratio greater than 8:1 in order to avoid hydrogen explosion and nitrogen oxides formation. Furthermore, it is understood from FIG. 10 that, if a mixture of hydrogen and air is subjected to complete combustion, a combustion temperature of 500° C. can be obtained by an air/hydrogen ratio of about 15.3:1. The ratio may be varied to have a range of ±10% about 15.3:1. This range is also far from the hydrogen explosion region defined as being less than an air/hydrogen ratio of about 6:1. Thus, it is possible to maintain the combustion catalyst 60 at a temperature of 500° C. by adjusting the air/hydrogen ratio to about 15.3:1.

Operation of the hydrogen combustion heater will be described in the following (see FIG. 1). At first, the water pump 65 is turned on to allow water to flow through the heat exchanger 64, while electricity is applied to the electric heating catalyst 50. Then, the blower 11 is energized to introduce air into the passage 13, while the flow rate regulating valve 12 is controlled to have a predetermined air flow rate. Alternatively, the blower can directly be controlled to have a predetermined air flow rate. Furthermore, hydrogen gas is introduced into the passage 13 from the hydrogen introducing pipe 16 by opening the pressure reducing valve 15 and the first valve 19. In fact, the hydrogen gas flow rate is set by the first valve 19 at 5 liters/min corresponding to ¹/₁₀ of the flow rate under the steady state operation, and the air flow rate is set by the flow rate regulating valve 12 at about 76 liters/min. With this, the air/hydrogen flow rate ratio during the starting time of the hydrogen combustion heater operation becomes about 15.3:1.

Electricity is applied to the electric heating catalyst 50 for a predetermined time. When the electric heating catalyst 50 has a temperature of 200° C. or higher by applying electricity, the application of electricity is no longer necessary. In other words, the temperature of the electric heating catalyst 50 continues to rise until 500° C. by only the catalytic reaction (hydrogen combustion). It is possible to have electric heating catalyst temperatures of 200° C. and 300° C. by applying electricity for 60 seconds and 120 seconds, respectively. Therefore, it suffices to apply electricity for about 120 seconds.

The combustion catalyst 60 is heated by the combustion gas that has been passed through the electric heating catalyst 50 and has been heated until 500° C.

During the initial stage of the hydrogen combustion, the controller monitors the temperature of the combustion gas coming from the electric heating catalyst 50 by the temperature sensor 73. In case that the combustion gas temperature exceeds a predetermined maximum temperature or does not rise during a predetermined time, the controller shuts down all the electric sources of the hydrogen combustion heater including the blower 11 and the water pump 65 since it is judged as being operational abnormality. Furthermore, the controller monitors temperatures in the vicinity of the combustion catalyst 60 by the temperature sensors 74 and 75. In case that the monitored temperature exceeds a predetermined maximum temperature or does not rise during a predetermined time, the controller shuts down all the electric sources of the hydrogen combustion heater. Furthermore, in case that the pressure sensor 77 detects an abnormal pressure due to freezing or pipe clogging, the controller also shuts down all the electric sources of the hydrogen combustion heater.

When the temperature of the combustion catalyst 60, which has been detected by the temperature sensor 74, reaches 300° C., the second valve 20 is also opened to introduce hydrogen gas into the passage 13 from the hydrogen introducing pipe 16 at a total flow rate of 50 liters/min, and at the same time the air flow rate is adjusted to about 760 liters/min by the flow rate regulating valve 12. With this, it is possible to have an air/hydrogen ratio of about 15.3:1. A part of the introduced hydrogen gas defined as flowing at a flow rate of 5 liters/min is subjected to an oxidation in the electric heating catalyst 50, and the rest of that defined as flowing at a flow rate of 45 liters/min is subjected to an oxidation in the combustion catalyst 60. The resulting combustion gas coming from the combustion catalyst 60 is heated to 500° C.

As stated above, each cell of the mixer 40 extends between the upstream and downstream ends to the mixer 40 in the axial direction of the smaller diameter portion 32. Therefore, it becomes possible to have a smooth gas flow through each cell, thereby avoiding pressure loss. By the provision of the holes 44 in the mixer 40, air and hydrogen gas can be uniformly mixed together. If this mixing is insufficient, a heat spot may be generated when the mixture is introduced into the electric heating catalyst 50. However, according to the preferred embodiment of the invention, when hydrogen gas was allowed to flow from the hydrogen introducing pipe 16 at a flow rate of 50 liters/min and air was allowed to flow from the blower 11 at a flow rate of 760 liters/min, a heat spot was not generated. Therefore, it was possible to obtain a stable hydrogen combustion.

While the combustion gas, which has been heated to 500° C. in the combustion catalyst 60, passes through the heat exchanger 64, a heat exchange occurs between the combustion gas and pure water flowing at 6 liters/min by the water pump 65. After that, the combustion gas (air) is discharged outside through the muffler 70. The combustion gas that has passed through the heat exchanger 64 having a heat exchanging capacity of 5 kW still has a high temperature of about 200° C. or higher. Therefore, it is possible to prevent the occurrence of water condensation in the casing 31.

During operation of the hydrogen combustion heater, when the temperature (detected by the temperature sensor 75) immediately downstream of the combustion catalyst 60 exceeds a predetermined temperature, the hydrogen gas flow rate is changed from 50 liters/min to 5 liters/min by closing the second valve 20, and at the same time the air flow rate is also changed from about 760 liters/min to about 76 liters/min, thereby achieving a low-flow-rate combustion condition. Under this condition, the hydrogen combustion in the combustion catalyst 60 is stopped, and the combustion catalyst 60 is maintained in a heated condition by the combustion gas coming from the electric heating catalyst 50.

When it becomes possible to terminate the low-flow-rate combustion condition, the hydrogen and air flow rates are increased to the respective normal values (50 and about 760 liters/min). With this, the hydrogen combustion (oxidation) in the combustion catalyst 60 is immediately resumed. When the pressure sensor 77 detects an abnormal high pressure, the controller opens the relief valve 79.

As stated above, the flow rate ratio of air to hydrogen gas is suitably controlled in the invention, thereby limiting the hydrogen combustion to a mild oxidation. This flow rate ratio of air to hydrogen gas is adjusted preferably to greater than 8:1, more preferably to about 15.3:1. Thus, it is possible to prevent firing or ignition of hydrogen gas. Furthermore, it is possible to avoid an excessive heating and thermal stress of the hydrogen combustion heater. Still furthermore, it is possible to suppress the formation of nitrogen oxides.

The mixer 40 of the invention does not have moving parts such as a screw. Therefore, it is improved in durability and lifetime.

Figure 11A:
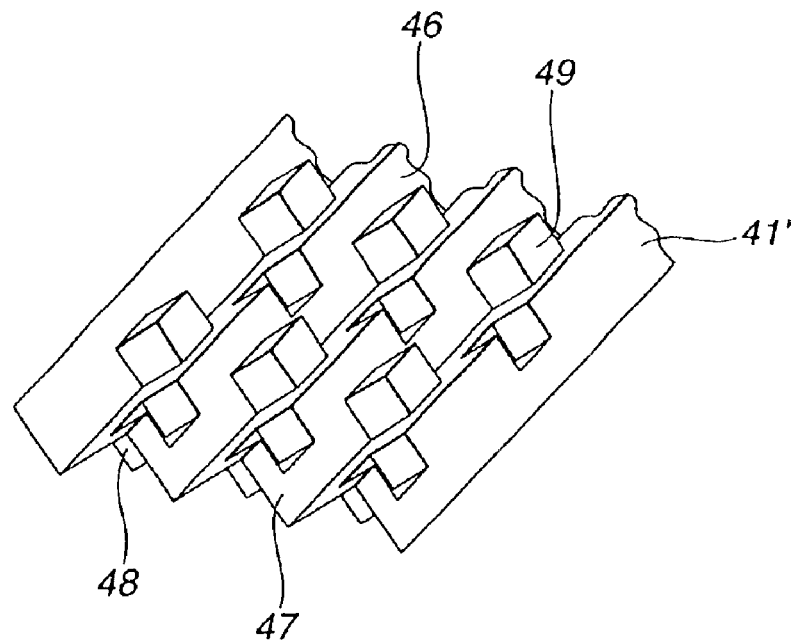
FIGS. 11A and 11B are perspective views each showing a part of a modification of the corrugated sheet of the mixer.
Figure 11B:
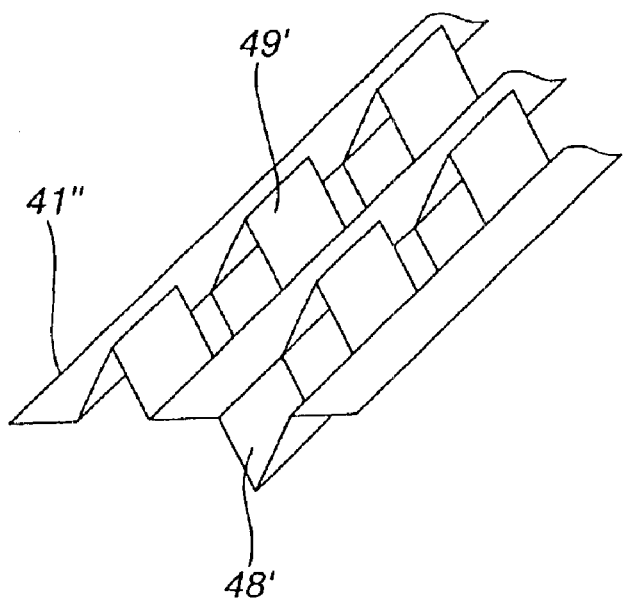

The above-mentioned mixer 40 is prepared by winding a laminate of the flat and corrugated sheets 42 and 43 each having circular holes (diameter: 1.0 mm). This mixer 40 can be modified variously as long as the resulting cells are communicated with each other. FIG. 1A shows a modified sheet 41' for making the mixer 40. This sheet 41' has a plurality of first and second cuts 48 and 49 that are alternately arranged in the direction along the width of the sheet 41'. Each first cut 48 is prepared by cutting a portion of a ridge 46 and then by folding the cut portion downward. Each second cut 49 is prepared by cutting a portion of a depression 47 and then by folding the cut portion upward. Thus, each of the first and second cuts has an opening for achieving a communication among the cells. FIG. 11B shows another modified sheet 41" for making the mixer 40. This sheet 41" has triangular ridges and depressions 49' and 48' that are alternately arranged in the direction along the width of the sheet 41".

Figure 12A:
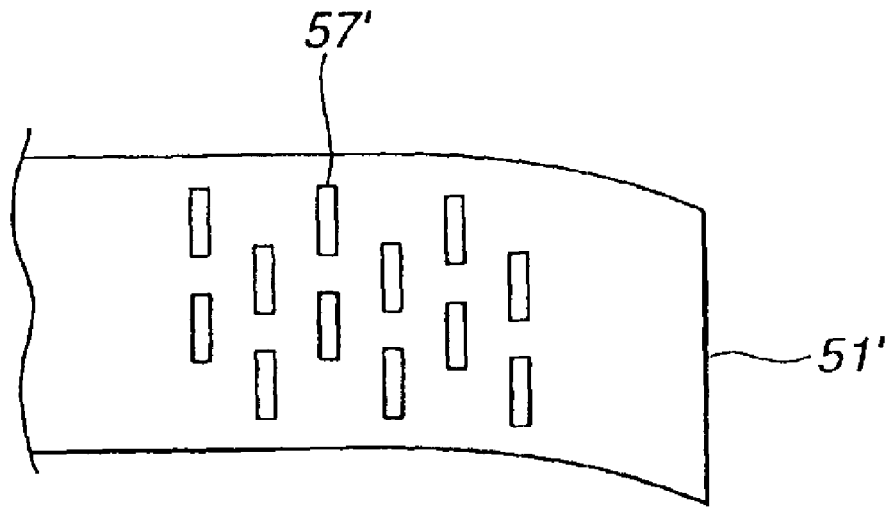
FIGS. 12A and 12B are schematic views each showing a part of a modification of the sheet of the electric heating catalyst.
Figure 12B:
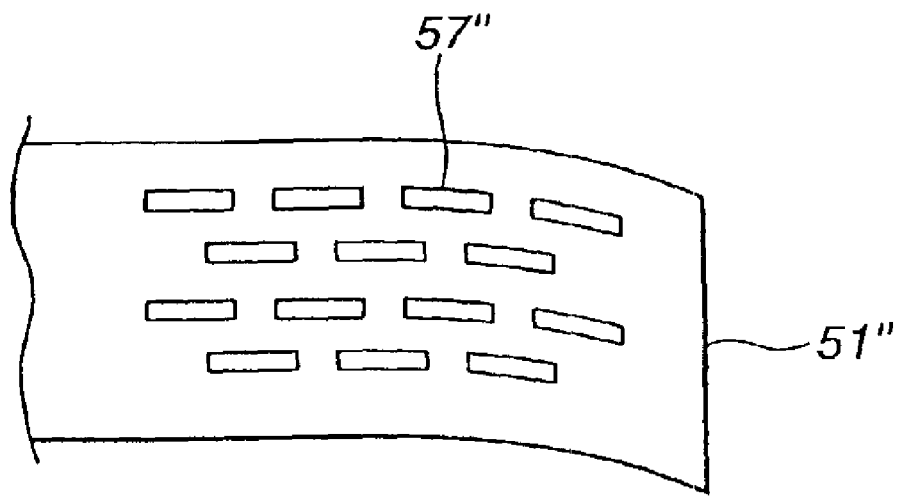

Each of the above-mentioned flat and corrugated sheets 52 and 53 for preparing the electric heating catalyst 50 is formed with circular holes a 7 (diameter: 1.0 mm). The shape of the holes is not particularly limited. For example, the holes may have a rectangular shape. FIG. 12A shows a sheet 51'0 with rectangular holes 57' each having a longitudinal axis arranged along the width of the sheet. FIG. 12B shows another sheet 51" with rectangular holes 57" each having a longitudinal axis arranged along the longitudinal direction of the sheet 51".

Figure 13:
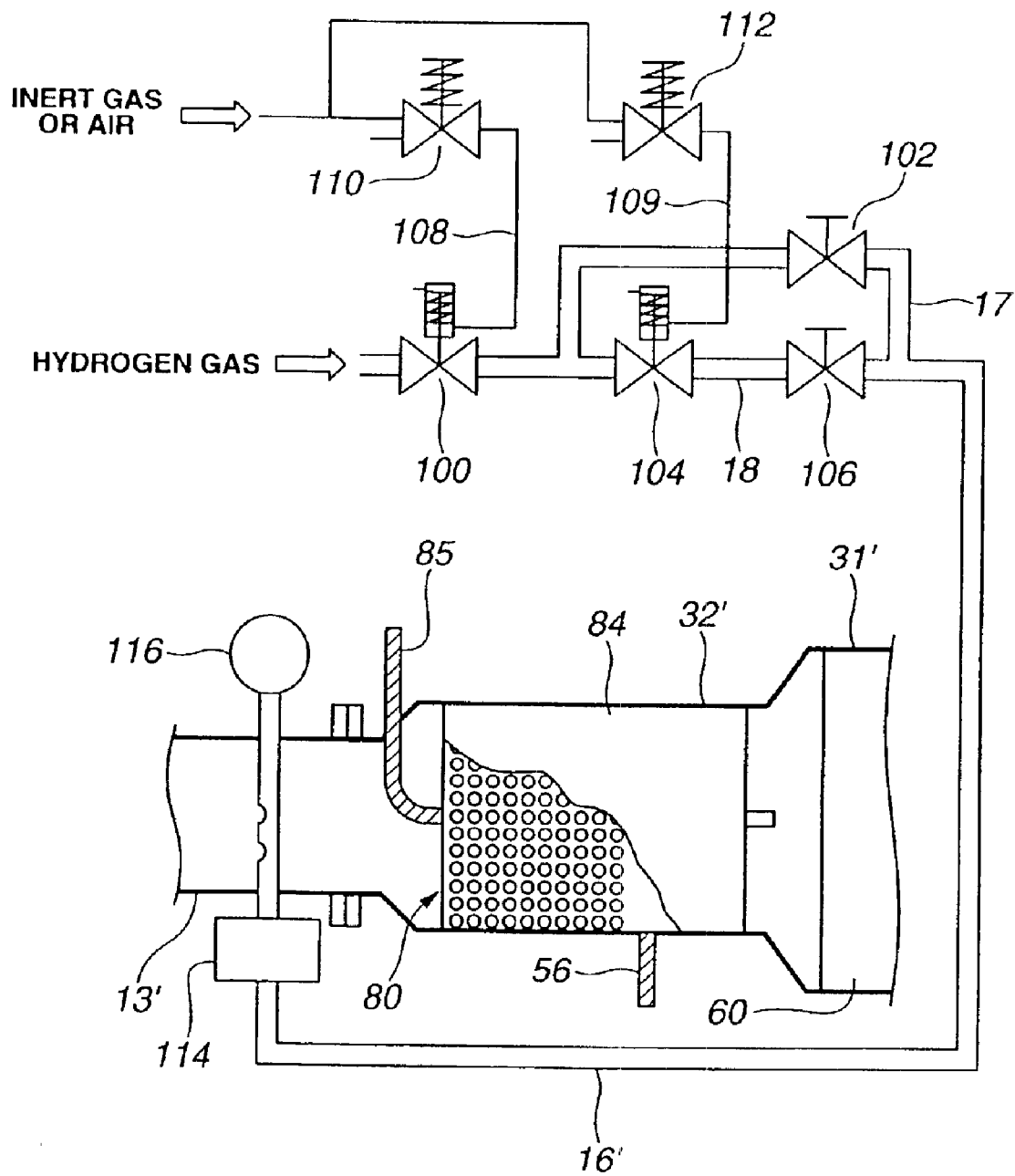
FIG. 13 is a schematic view showing an upstream par of a second hydrogen combustion heater according to second preferred embodiment of the present invention.

FIG. 13 shows an upstream part of a second hydrogen combustion heater according to a second preferred embodiment of the present invention. This hydrogen combustion heater has an electric heating catalyst 80 that is provided with a function of the mixer. The electric heating catalyst 80 is disposed in a smaller diameter portion 32' of a heater unit casing 31'.

Figure 14:
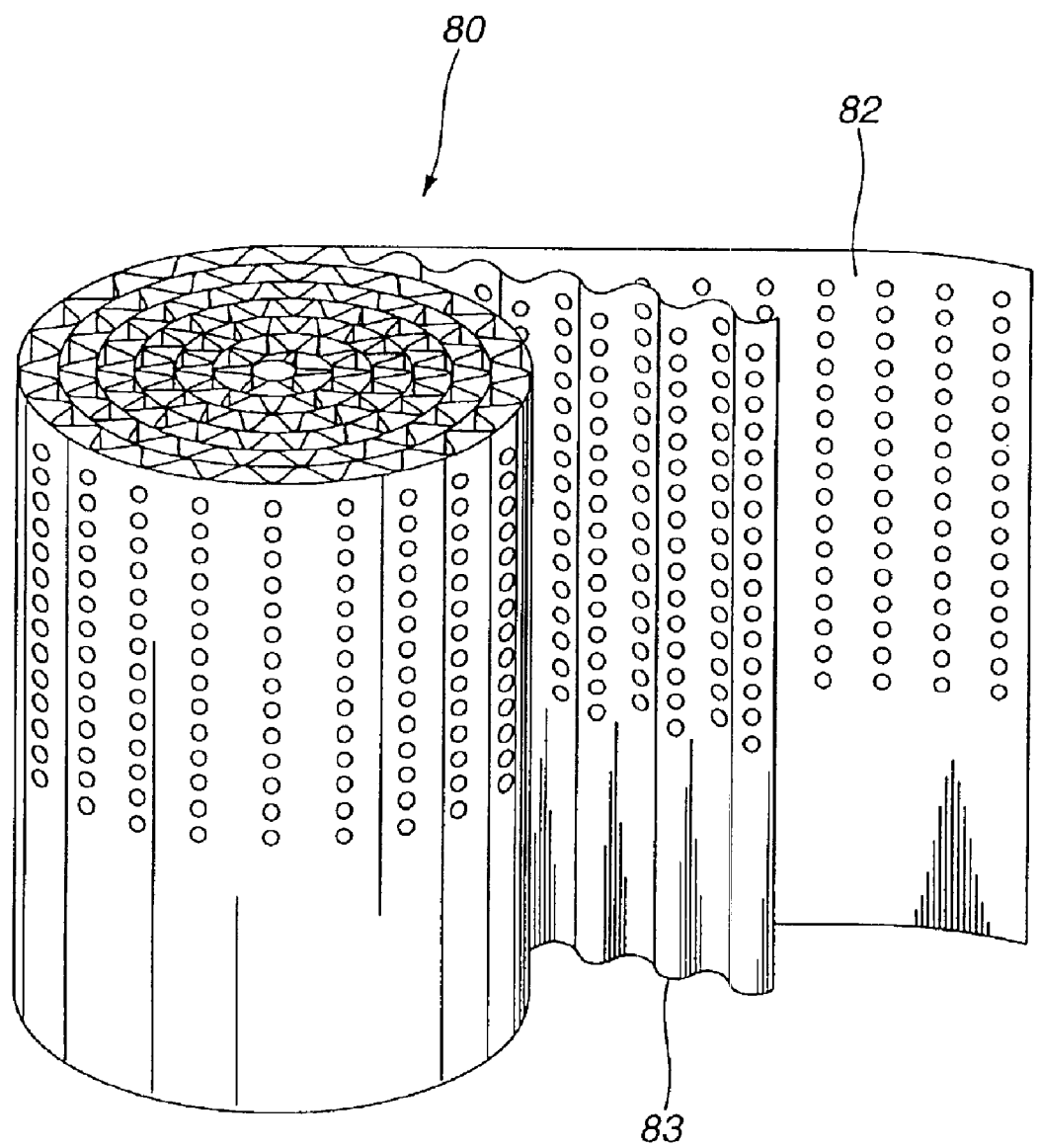
FIG. 14 is a perspective view showing a first catalyst (electric heating catalyst) according to the second preferred embodiment.

As shown in FIGS. 13 and 14, the electric heating catalyst 80 is prepared by winding a laminate of flat and corrugated sheets 82 and 83, then by brazing a plurality of spots of the wound body, and then pressing the wound body into an outer cylinder 84 of the smaller diameter portion 32' (inner diameter: 58 mm). Each of the flat and corrugated sheets 82 and 83 is a stainless steel sheet (containing 20% Cr, 5% Al and the remainder of Fe) having a width of 80 mm and a thickness of 80 mm. The flat and corrugated sheets 82 and 83 each support thereon a catalyst component containing 1% Pt and the remainder of $Al_2O_3$. The electric heating catalyst 80 has a first electrode 85 passing through the center of the wound body and a second electrode 56 connected with the outer cylinder 84. These electrodes 85 and 56 extend outward through an outer periphery of the casing 31'.

Figure 15:
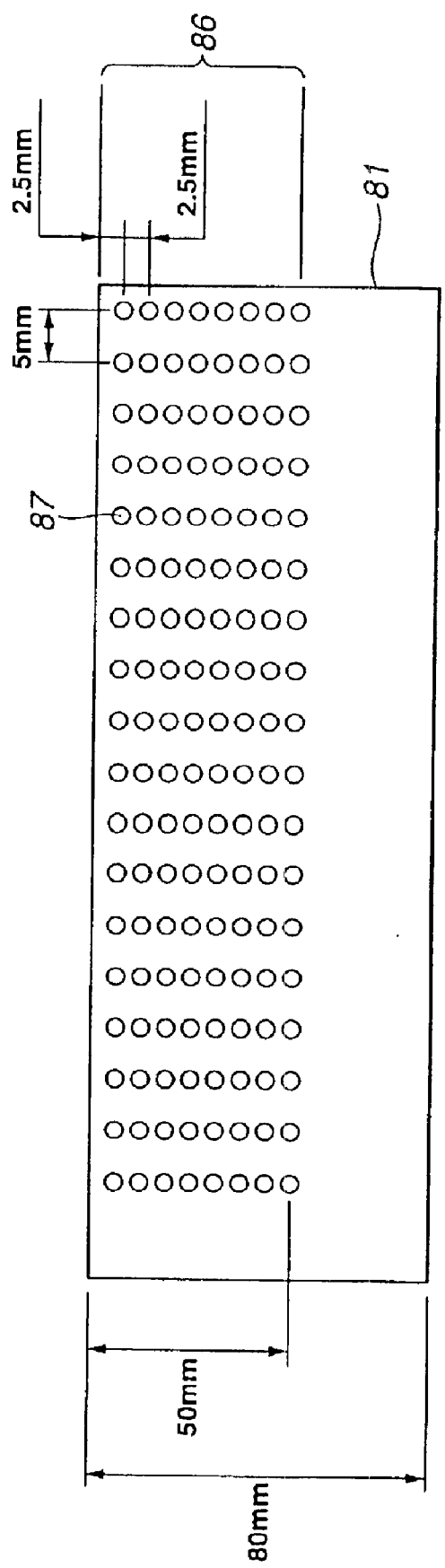
FIG. 15 is a plan view showing a sheet for preparing the electric heating catalyst of FIG. 14.

As shown in FIG. 15, a stainless steel sheet 81 used for the flat and corrugated sheets 82 and 83 is provided on its one side (length: 50 mm) with a perforate portion 86 having a plurality of circular holes (diameter: 1.0 mm) at a pitch of 2.5 mm in the direction along the width of the sheet 81 and at a pitch of 5 mm in the longitudinal direction of the sheet 81. The corrugated sheet 83 has a pattern of waves having a height of 1.2 mm and a pitch of 2.6 mm. The resulting wound body has an electric resistance of about 0.8 Ω. The electric heating catalyst 80 is disposed in the smaller diameter portion 32' in a manner to dispose the perforated portion 86 on the upstream side. Therefore, hydrogen gas and air introduced into the electric heating catalyst 80 are uniformly mixed together by a gas transportation or mixing among the cells of the electric heating catalyst 80. The electric heating catalyst 80 is heated by applying electricity thereto during this mixing, too. Therefore, the catalytic reaction (hydrogen combustion) is assuredly accelerated. The electric heating catalyst 80 according to the second preferred embodiment is somewhat longer in the axial direction than the electric heating catalyst according to the first preferred embodiment, since the former has the perforated portion 86. It is, however, possible to shorten the lengths of the smaller diameter portion 32' of the casing by the second preferred embodiment, as compared with the first preferred embodiment, since an independent mixer is not provided in the second preferred embodiment. Therefore, it becomes possible to make the size of the heater unit smaller in the second preferred embodiment. In FIGS. 13–15, the size and the pitch of the holes 87 are enlarged for easiness to understand the structure.

As shown in FIG. 13, a hydrogen introducing pipe 16' (inner diameter: 8 mm) of the second hydrogen combustion heater passes through the passage 13' (inner diameter: 58 mm) and is equipped with a hydrogen stopping valve 100, in place of the pressure reducing valve, and is connected with a hydrogen reservoir (not shown). The hydrogen introducing pipe 16' has a first hydrogen passage 17 with a first restrictor 102 and a second hydrogen passage 18 with a hydrogen stopping valve 104 and a second restrictor 106. The first and second restrictors 102 and 106 are such that the ratio of the flow rate through the first restrictor 102 to that through the second restrictor 106 is 1:9. When only the hydrogen stepping valve 100 is opened, hydrogen gas passes through the first restrictor 102 and then is introduced into the passage 13' at a flow rate of 5 liters/min. When the hydrogen stopping valve 104 is also opened, hydrogen gas passes through the first and second restrictors 102 and 106 and then is introduced into the passage 13' at a total flow rate of 50 liters/min. The hydrogen stopping valves 100 and 104 are operated by gas. In fact, these valves are opened by adding thereto a pressure of a gas (air or inert gas) and maintained in a closed condition at a predetermined pressure or lower of the gas.

Gas supplying pipes 108 and 109 are respectively connected with the first and second hydrogen stopping valves 100 and 104 and are respectively formed with three-way solenoid valves 110 and 112. These solenoid valves are each controlled by the controller. When the three-way solenoid valves 110 and 112 are opened, they add gas pressures to the hydrogen stopping valves 100 and 104, respectively. When they are closed, they release pressures from the hydrogen stopping valves 100 and 104, respectively. Therefore, the hydrogen stopping valves 100 and 104 are controlled to open or close by controlling the three-way solenoid valves, 110 and 112, respectively. As stated above, the hydrogen stopping valves 100 and 104 are operated by gas. Therefore, there is no danger of a contact between hydrogen gas and electric energy. Even if the operational fluid is leaked by an accident, the operational fluid is an inert gas or air. Therefore, there is no fear of having an accident, even if the operational gas is in contact with hydrogen gas.

As shown in FIG. 1, hydrogen gas is introduced into the passage 13 from a single opening of the hydrogen introducing pipe 16 in the first hydrogen combustion heater. In contrast, as shown in FIG. 13, hydrogen is introduced into the passage 13' from a plurality of openings of the hydrogen introducing pipe 16' in the second hydrogen combustion heater. This is preferable for achieving a uniform mixing of hydrogen gas and air. In fact, an end portion (hydrogen discharging portion) of the hydrogen introducing pipe 16' passes through the passage 13' upwardly, and this end portion has the above openings. The hydrogen introducing pipe 16' is equipped with a filter 114 at a position immediately before the passage 13' in order to separate water drops used for removing dust contained in hydrogen gas. The hydrogen introducing pipe 16' is provided at its end with a pressure sensor 116 above the passage 13'. The pressure sensor 116 makes it possible to conduct a feedback control, thereby more highly precisely controlling the hydrogen gas flow rate. In case that the pressure sensor 116 is omitted, the hydrogen introducing pipe 16' can have a closed end at a position near the after-mentioned opening 90 at the center of the section of the passage 13'.

Figure 16A:
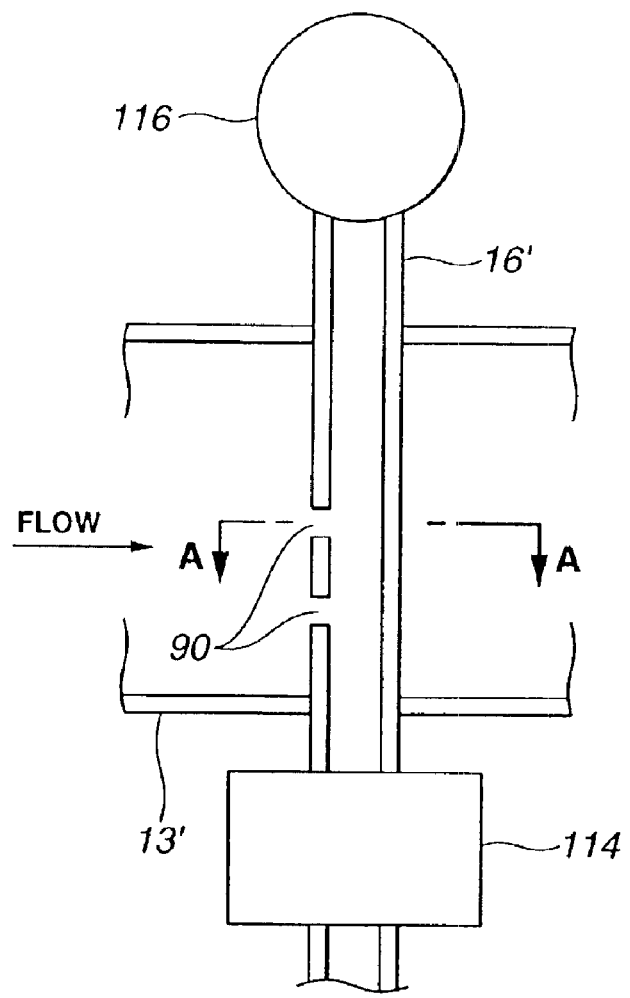
FIG. 16A is an enlarged sectional view showing a discharge portion of a hydrogen introducing pipe of FIG. 13.
Figure 16B:
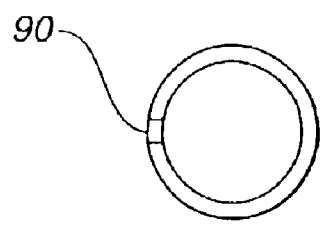
FIG. 16B is a sectional view taken along lines A—A of FIG. 16A.

FIGS. 16A and 16B show a detailed arrangement of two openings 90 of the hydrogen introducing pipe 16' for discharging hydrogen gas into the passage 13'. The upper opening 90 is directed upstream and positioned in the vicinity of the center of the passage 13' in the section of FIG. 16A. The lower opening 90 is also directed upstream and is at a position away from the bottom surface of the passage 13' by a distance of ⅖ of the radius of the passage 13'. Such arrangement of the openings 90 makes it possible to start a mixing of hydrogen gas and air at the position of the openings 90 in the entire section of the passage 13'. Therefore, even if the distance between the end portion of the hydrogen introducing pipe 16' and the electric heating catalyst 80 is short, it is possible to have a substantial degree of mixing of hydrogen gas and air when they reach the electric heating catalyst 80. With this, it is possible to avoid the generation of heat spot at the upstream end surface of the electric heating catalyst 80. The passage 13' has an inner diameter of 58 mm, the hydrogen introducing pipe 16' has an outer diameter of 10 mm and an inner diameter of 8 mm, and each of the openings 90 has a diameter of 1.5 mm.

Figure 17A:
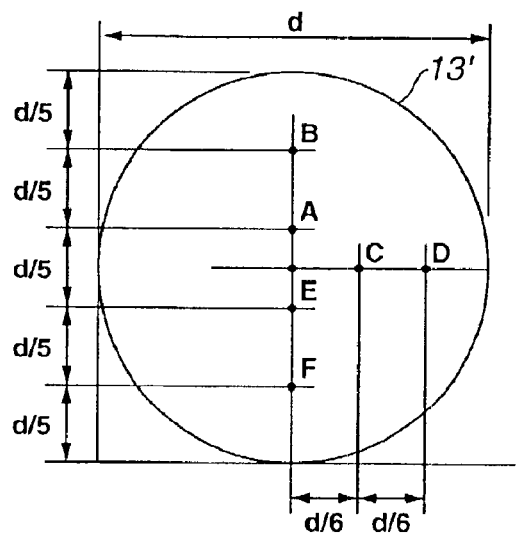
FIG. 17A is a view showing hydrogen concentration measurement points A–F in a passage of the second hydrogen combustion heater, sectioned at a position that is 30 mm downstream of the discharge portion of the hydrogen introducing pipe and is upstream of the electric heating catalyst.
Figure 17B:
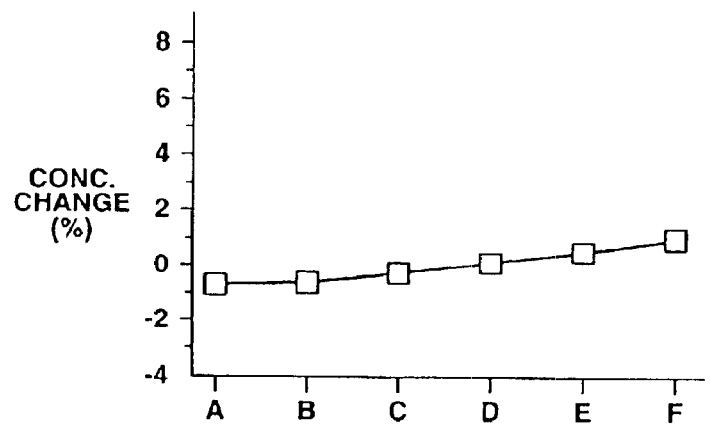
FIG. 17B is a graph showing a percentage of a deviation of hydrogen concentration at each point of FIG. 17A from the average hydrogen concentration.

FIG. 17B shows hydrogen concentration changes or differences of respective positions (A–F) in the section (see FIG. 17A) of the passage 13' at a position 30 mm downstream of the passage 13' from the hydrogen introducing pipe 16', from the average hydrogen concentration, when hydrogen gas was allowed to flow at 50 liters/min from the hydrogen introducing pipe 16', and when air was allowed to flow at 760 liters/min from the blower. The inner diameter of the passage 13' is represented by "d" in FIG. 17A. It is understood from FIG. 17B that hydrogen concentration changes of the positions A–F were within a range of +1 to −1%. This means that a uniform mixing of hydrogen gas and air is already achieved at the upstream end of the electric heating catalyst 80. Thus, it was possible to avoid the heat spot generation and to obtain a stable hydrogen combustion.

Figure 17C:
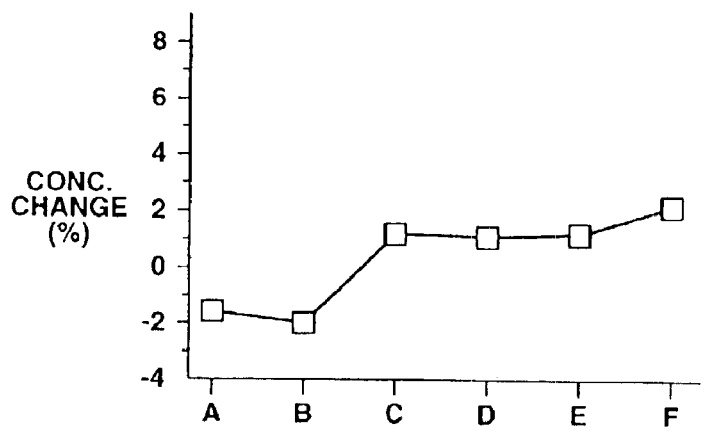
FIG. 17C is a graph similar to FIG. 17B, but showing the results when the hydrogen and air flow rates in the case of FIG. 17B were each reduced by a factor of 6.

FIG. 17C shows the results when the hydrogen and air flow rates in the case of FIG. 17B were each reduced by a factor of 6. It is understood from FIG. 17C that hydrogen concentration changes of the positions A–F were within a range of +2 to −2%.

Figure 18A:
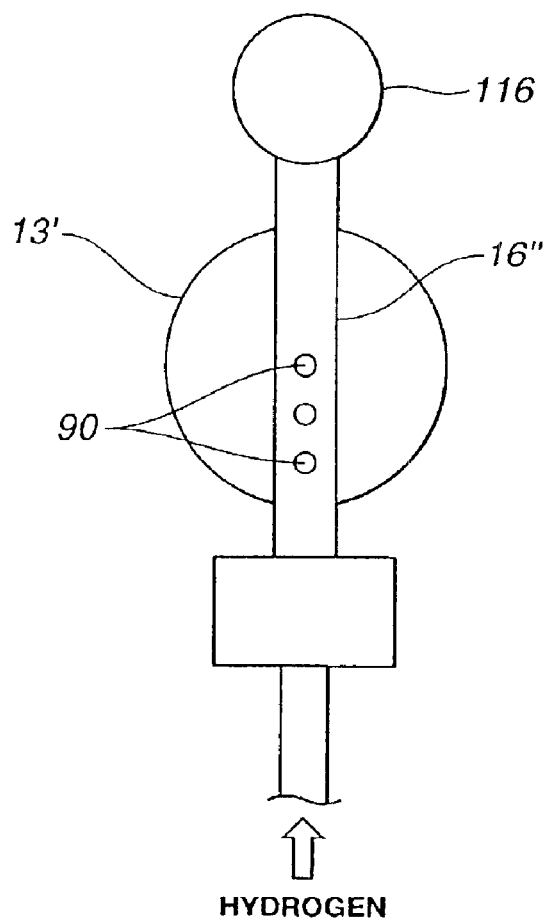
FIG. 18A is an enlarged sectional view showing a first modification of the hydrogen introducing pipe of FIG. 16.
Figure 18B:
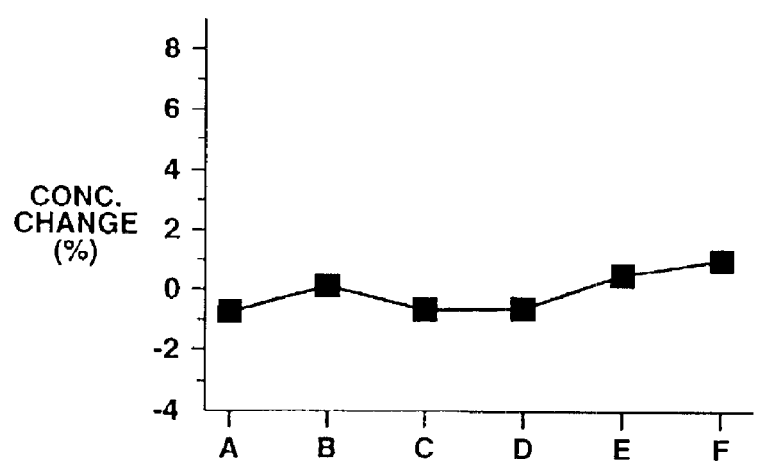
FIG. 18B is a graph similar to FIG. 17B, but showing the results in the case of the first modification of FIG. 18A.

FIG. 18A shows a first modification 16" of the hydrogen introducing pipe 16' of FIG. 16. The first modification 16" has three openings 90 for discharging hydrogen gas. The upper opening 90 is positioned at the center of the section of the passage 13', and the middle and lower openings 90 are respectively at positions away from the bottom surface of the passage 13' by distances of ⅔ and ⅓ of the radius of the passage 13'. FIG. 18B shows the results obtained under the same conditions as those for FIG. 17B, except that the first modification 16" was used for the hydrogen concentration determination. It is understood from FIG. 18B that hydrogen concentration changes of the positions A–F were within a range of +1 to −1%. This means that hydrogen gas and air were sufficiently mixed together.

Figure 19A:
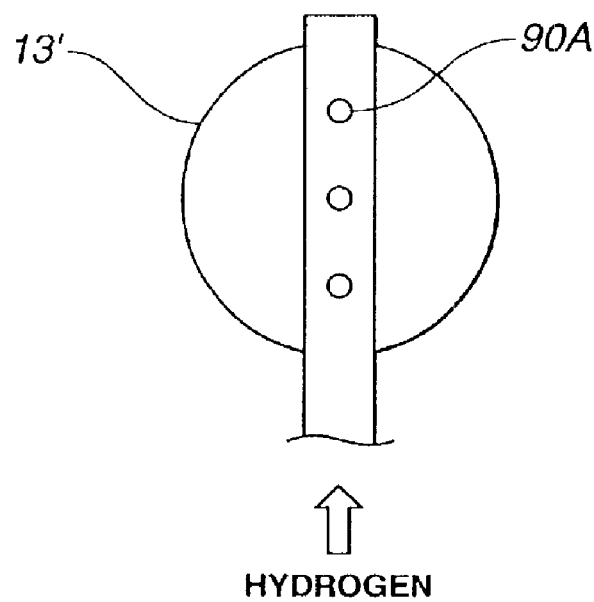
FIG. 19A is an enlarged sectional view showing a second modification of the hydrogen introducing pipe of FIG. 16.
Figure 19B:
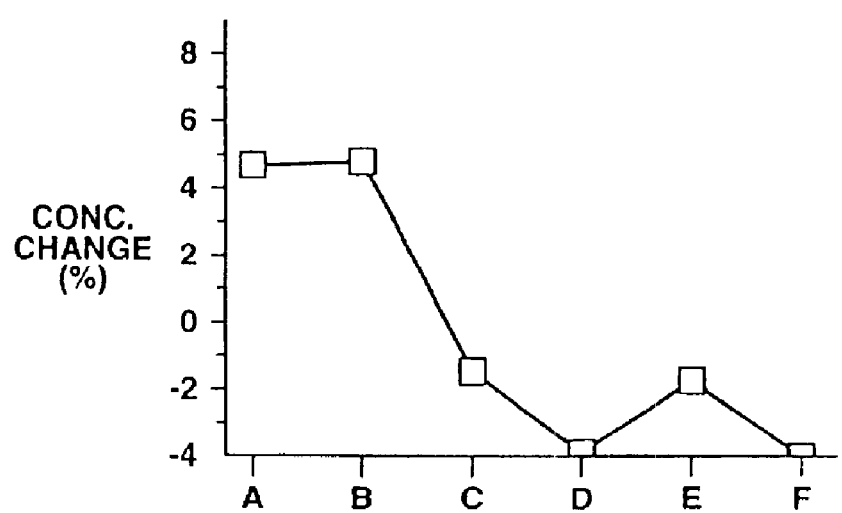
FIG. 19B is a graph similar to FIG. 17B, but showing the results in the case of the second modification of FIG. 19A.

FIG. 19A shows a second modification of the hydrogen introducing pipe 16' of FIG. 16. The second modification has three openings 90A. The middle opening is positioned at the center of the section of the passage 13', and the upper and lower openings are at symmetrical positions about the middle opening, as shown in FIG. 19A. FIG. 19B shows the results obtained under the same conditions as those for FIG. 17B, except that the second modification was used for the hydrogen concentration determination. It is understood from FIG. 19B that hydrogen concentration changes of the positions A–F had a greater variation (+5 to −4%) than those of FIGS. 17B and 18B. This means that a heat spot tends to be generated and thereby it may be difficult to obtain a stable hydrogen combustion by the second modification.

Figure 20:
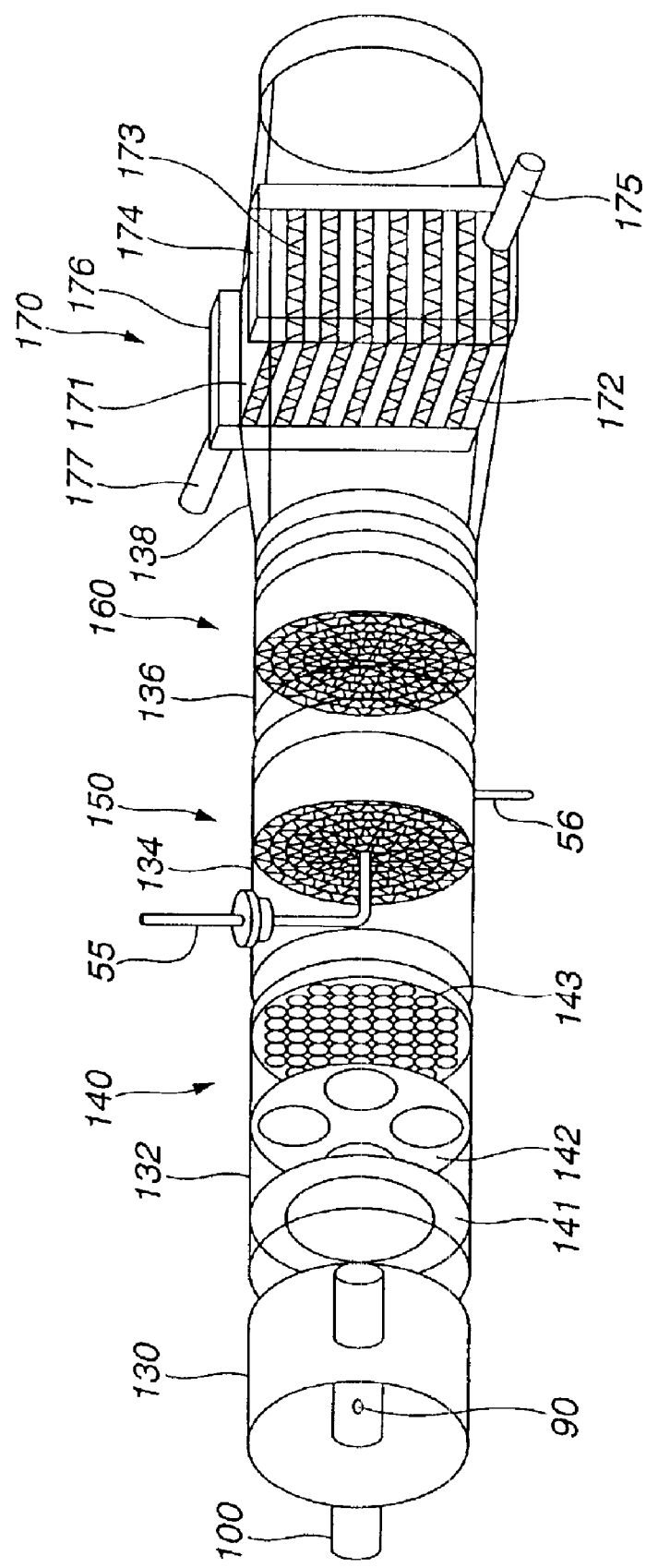
FIG. 20 is a perspective view showing a third hydrogen combustion heater according to a third preferred embodiment of the present invention.

FIG. 20 shows a third hydrogen combustion heater according to a third preferred embodiment of the present invention. This third heater is similar in construction to the first heater. Therefore, explanation of the same parts and the same functions may be omitted from the following description.

The third heater has a passage 130, a mixer 140, an electric heating catalyst 150, a combustion catalyst 160, and a heat exchanger 170. This passage 130 corresponds to the passage 13 of FIG. 3. The mixer 140, the electric heating catalyst 150 and the combustion catalyst 160 are disposed in their respective casings 132, 134 and 136. Each of these casings has the same diameter as that of the passage 130 (inner diameter: 58 mm). The passage 130 and these casings 132, 134 and 136 are connected to constitute a single straight passage.

The electric heating catalyst 150 and the combustion catalyst 160 are respectively the same as those 50 and 60 of FIG. 1, except in that the catalysts 150 and 160 are the same in diameter. The heat exchanger 170 is formed of flat sheets and corrugated sheets alternately laminated together. The heat exchanger 170 has a heat exchanging portion 171 having a shape of rectangular parallelepiped. The heat exchanging portion 171 is formed with first cells 172 and second cells 173 that are alternately laminated together at right angles relative to each other. In fact, the first and second cells 172 and 173 are formed by arranging adjacent corrugated sheets at right angles relative to each other. The heat exchanging portion 171 is disposed at a central portion of the casing 138. The heat exchanger 170 is further formed at both side ends of the second cells 173 with first and second tanks 174 and 176 that communicates with each second cell 173. A water introducing pipe 175 and a water discharging pipe 177 are respectively attached to the first and second tanks 174 and 176. The combustion gas and water are respectively allowed to flow through the first and second cells 172 and 173 of the heat exchanging portion 171. Thus, when water introduced into the first tank 174 from the water introducing pipe 175 passes through the second cells 173, it is heated by the combustion gas flowing through the first cells 172. The casing 138 has a rectangular section at the position of the heat exchanging portion 171. This rectangular section gradually changes into a circular section toward an upstream position. Thus, the casing 138 is fitted at its upstream end with the casing 136 of the combustion catalyst 160. Similarly, the rectangular section of the casing 138 gradually changes into a circular section toward a downstream position.

Although not shown in FIG. 20, the third hydrogen combustion heater has the temperature sensors 73, 74, 75 and 76, the pressure sensor 77, the temperature sensor 78, and the relief valve 79 at positions corresponding to those of the first hydrogen combustion heater shown in FIG. 1.

Figure 21A:
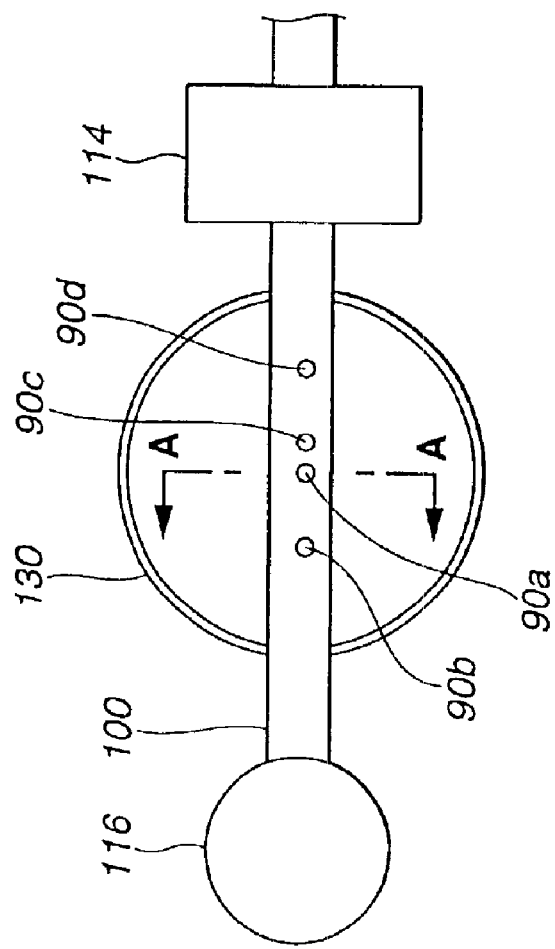
FIG. 21A is an enlarged sectional view showing a discharge portion of a hydrogen introducing pipe of FIG. 20.

As shown in FIG. 21A, a hydrogen introducing pipe 100 extends in a horizontal direction and passes transversely through the passage 130 and has four openings 90a–90d for discharging hydrogen gas into the passage 130. The hydrogen introducing pipe 100 has a filter 114 for separating water drops used for removing dust contained in hydrogen gas, immediately before the passage 130. The hydrogen introducing pipe 100 is provided at its end with a pressure sensor 116 immediately after the passage 130.

Figure 21B:
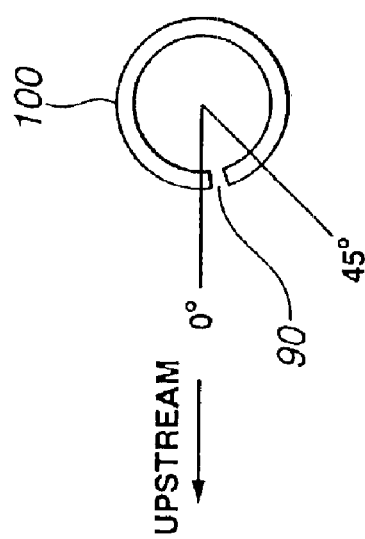
FIG. 21B is a sectional view taken along lines A—A of FIG. 21A.

As is seen from FIG. 21A, the opening 90a is disposed at the center of the section of the passage 130, the openings 90c and 90d are disposed upstream of the opening 90a, and the opening 90b is disposed downstream of the opening 90a. For example, the passage 130 has an inner diameter of 58 mm; the hydrogen introducing pipe 100 has an outer diameter of 10 mm and an inner diameter of 8 mm; and each of the openings 90a–90d has a diameter of 1.5 mm. Each of the openings 90b and 90d are disposed at positions away from the opening 90a by a distance of 12 mm. It is preferable that the total opening area of the openings (the openings 90c and 90d in the case of FIG. 21A) positioned in the upstream half of the hydrogen introducing pipe in the section of the passage 130 is larger than that of the openings (the opening 90b in the case of FIG. 21A) positioned in the downstream half thereof. If each opening has the same opening area, the number of the openings positioned in the upstream half is preferably greater than that positioned in the downstream half. Furthermore, as shown in FIG. 21B, the openings 90a–90d of the hydrogen introducing pipe 100 are each directed upstream of the passage 130 to be within 45 degrees down from horizontal (i.e., 0–45 degrees).

Figure 22A:
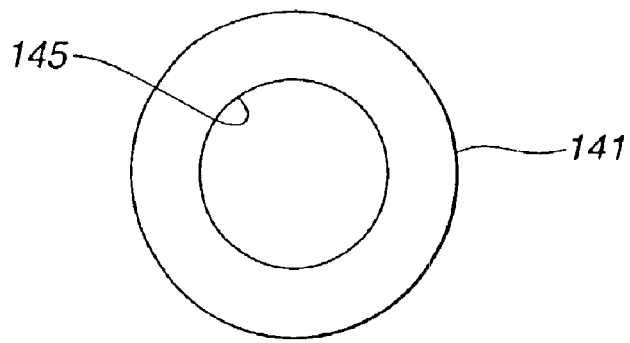
FIGS. 22A, 22B and 22C are plan views respectively showing first, second and third members of the mixer of FIG. 20.
Figure 22B:
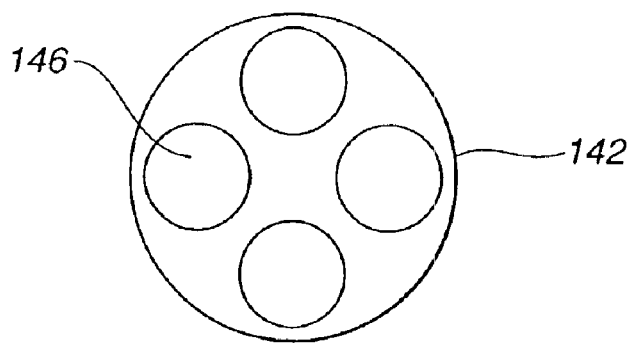

As shown in FIG. 20, the mixer 140 has first, second and third members 141, 142 and 143 that are spaced from each other and disposed in the casing 132. As shown in FIG. 22A, the first member 141 has a center hole 145 (diameter: 35 mm). The second member 142 has four holes 146' diameter: 20 mm) equally spaced from each other. The third member 143 has 69 holes 147 (diameter: 6 mm) equally spaced from each other. The first and second members 141 and 142 are spaced from each other by a distance of 20 mm. The second and third members 142 and 143 are also spaced from each other by a distance of 20 mm. When the passage 130 and the electric heating catalyst 150 are connected with each other, the first member 141 and the hydrogen introducing pipe 10 are spaced from each other by a distance of 20 mm, and the third member 143 and the electric heating catalyst 150 are spaced from each other by a distance of 30 mm.

Operation of the third hydrogen combustion heater is substantially the same as that of the first hydrogen combustion heater. Therefore, the same descriptions are not repeated in the following. Air and hydrogen gas are uniformly mixed together, when they pass through the first, second and third members 141, 142 and 143 of the mixer 140.

As mentioned above, the hydrogen introducing pipe 100 is connected with the passage 130 in a manner to horizontally pass therethrough (see FIG. 21A). Furthermore, the openings are disposed such that the number of the openings in the upstream half is greater than that of the openings in the downstream half. Therefore, it became earlier to start a mixing of hydrogen gas and air, as compared with the case of providing a single opening to discharge hydrogen gas. Furthermore, it was possible to obtain a higher degree of mixing, even as compared with the case of providing a plurality of openings equally disposed about the center of the section of the passage 130.

Figure 23A:
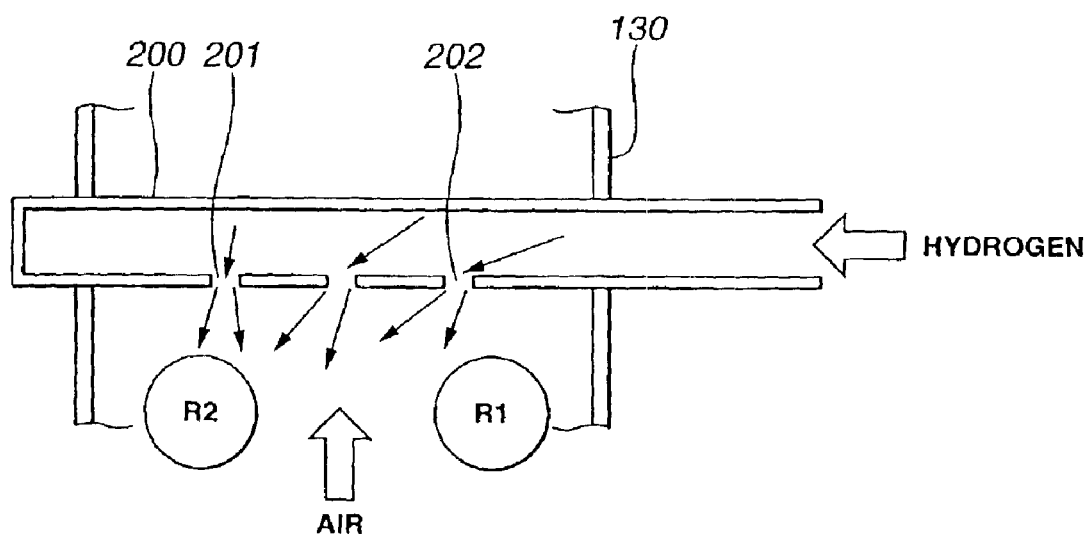
FIGS. 23A and 23B are sectional views each showing schematic hydrogen gas flows from openings of the discharge portion of the hydrogen introducing pipe into the passage of the third hydrogen combustion heater.
Figure 23B:
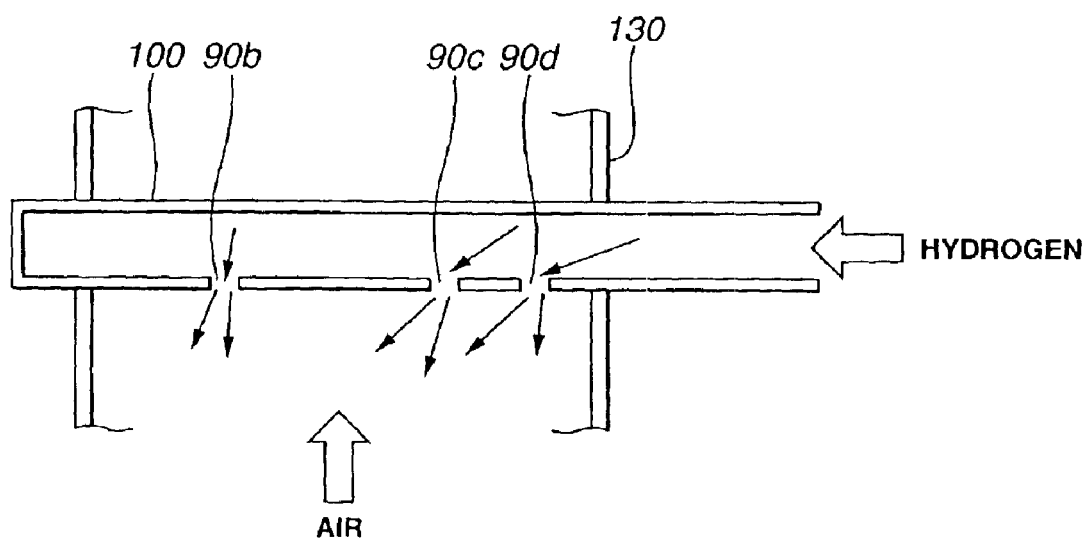

FIG. 23A shows a hydrogen gas flow from the downstream and upstream openings 201 and 202 and the middle opening (no numeral) therebetween of the hydrogen introducing pipe 200 passing through the passage 130 in a horizontal direction. The openings 201 and 202 are equally spaced from the middle opening. In this case, as shown by the arrows of FIG. 23A, the direction of the hydrogen flow from the upstream opening 202 is more inclined toward the direction of the hydrogen gas flow in the hydrogen introducing pipe 200, as compared with that of the hydrogen flow from the downstream opening 201. With this, there is a tendency to generate a low hydrogen concentration region R1 near the upstream opening 202. Furthermore, there is a tendency to generate a high hydrogen concentration region R2 near the downstream opening 201, due to the concentration of the hydrogen flows toward the region R2. In other words, there is a tendency to generate a hydrogen concentration imbalance in the case of FIG. 23A. In contrast, according to the preferred embodiment shown in FIG. 23B, the number of the openings 90c and 90d disposed in the upstream half is greater than that of the openings 90b disposed in the downstream half. Therefore, there is no tendency to generate the above-mentioned hydrogen concentration imbalance. This is advantageous to achieve a stable hydrogen combustion. In FIG. 23B, the middle opening, the pressure sensor and the like are omitted for simplicity.

As stated above, the openings of the hydrogen introducing pipe 108 are directed upstream of the passage 130 to be within 45 degrees down from horizontal (0–45 degrees), as shown in FIG. 21B. With this, it was possible to obtain a good mixing of hydrogen gas and air. In other words, the hydrogen concentration variation at a position 30 mm downstream of the passage from the hydrogen introducing pipe in a first case that the openings are directed upstream to be within 45 degrees down from horizontal was markedly less than that in a second case that the openings are directed upstream to be up from horizontal or in a third case that they are directed downstream. In the third case, it is assumed that hydrogen gas and air reach the position 30 mm downstream of the passage from the hydrogen introducing pipe, while they are not sufficiently mixed together. In the second case, hydrogen tends to remain in an upper region of the passage 130 without a sufficient mixing with air, since hydrogen gas is lighter in weight than air.

Figure 24C:
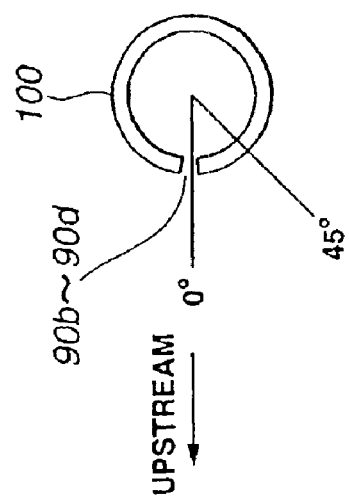
FIGS. 24B and 24C are sectional views respectively taken along lines B—B and C—C of FIG. 24A.
Figure 24B:
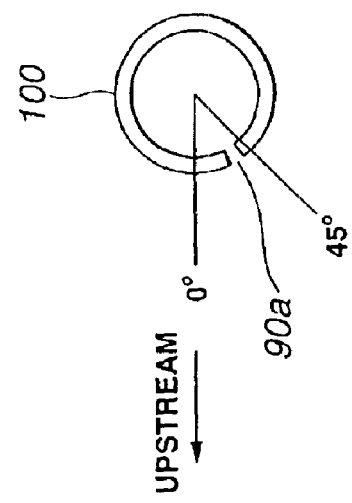
Figure 24A:
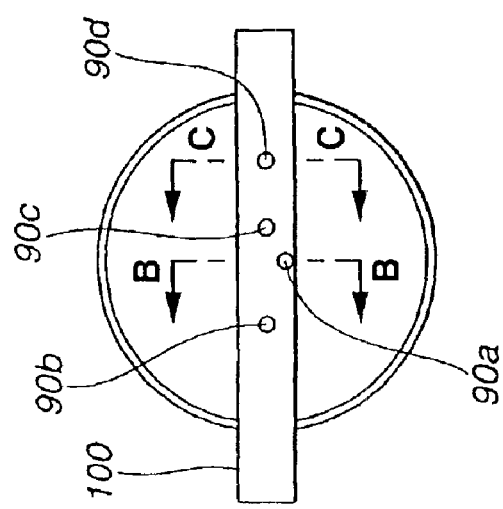
FIG. 24A is a partly sectional view showing the discharge portion of the hydrogen introducing pipe.

FIG. 24A shows an optional arrangement of the openings 90a–90d of the hydrogen introducing pipe 100. In fact, only the opening 90a is directed upstream to be within 45 degrees down from horizontal (see FIG. 24B), and the openings 90b–90d are directed upstream to be horizontal (see FIG. 24C). This optional arrangement can also achieve a sufficient mixing of hydrogen gas and air.

The above-mentioned openings of the hydrogen introducing pipe according to the preferred embodiment of the invention have the same size and are arranged such that the number of the openings in the upstream half is greater than that of the openings in the downstream half. Alternatively, the openings in the upstream half can at least partly be made to have a size greater than those in the downstream half. In this case, the number of the former may be the same as that of the latter.

As stated above, the mixer 140 has first, second and third members 141, 142 and 143 (see FIGS. 20 and 22A–22C). In fact, the first, second and third members are disposed in this order toward a downstream position. In other words, the number of the holes 145, 146 and 147 is increased, and the size of these holes is reduced, as it passes from the first member 141 to the third member 143. Therefore, hydrogen gas and air are sufficiently mixed together as they flow downstream from the first member 141 to the third member 143.

Figure 25A:
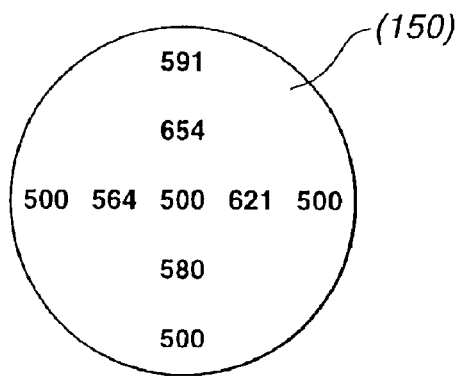
FIG. 25A is a sectional view of FIG. 20 at a position of the downstream end of the first catalyst, showing numbers representing temperatures at their respective positions in the section, when the first to third members constitute the mixer (first mixer)
Figure 25B:
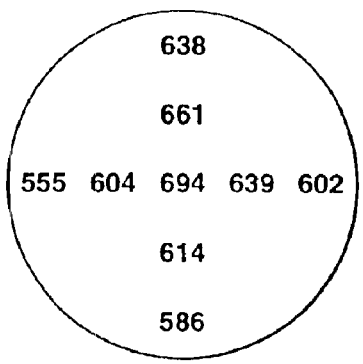
FIG. 25B is a view similar to FIG. 25A, but showing those numbers when the first to fourth members constitute the mixer (second mixer)
Figure 25C:
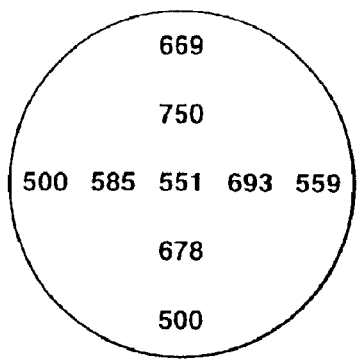
FIG. 25C is a view similar to FIG. 25A, but showing those numbers when only the second and third members constitute the mixer (third mixer)
Figure 25D:
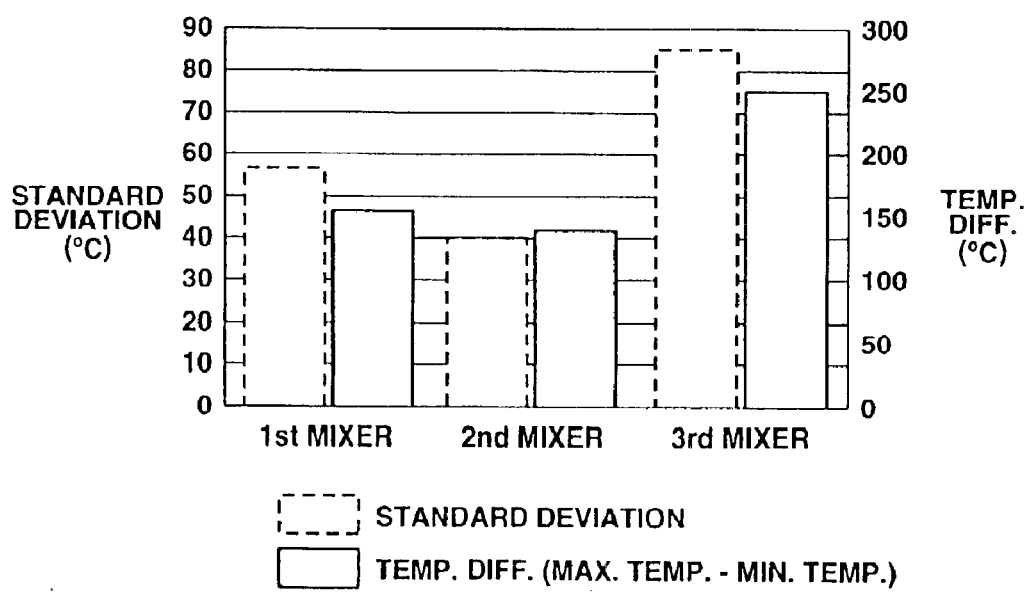
FIG. 25D is a graph showing the standard deviation and the difference between the maximum and minimum temperatures with respect to the temperatures of FIGS. 25A, 25B and 25C.

FIG. 25A shows numbers representing temperatures at their respective positions in the section of the hydrogen combustion heater at a position of the downstream end of the electric heating catalyst, when the first to third members 141–143 constitute the mixer (first mixer) 140. In fact, the respective positions in the section were selected by dividing each of the vertical and horizontal diametral lines of the section into five sections. FIG. 25B is a slight modification of FIG. 25A, showing those numbers when the first to third members 141–143 and a fourth member constitute the mixer (second mixer). The fourth member is disposed downstream of the third member 143 and has a plurality of holes that are greater in number than those 147 of the third member 143. FIG. 25C is another slight modification of FIG. 25A, showing those numbers when only the second and third members 142–143 constitute the mixer (third mixer). It is understood from FIG. 25A in the case of the first mixer that the maximum and minimum temperatures are respectively 654° C. and 500° C. It is understood from FIG. 25B in the case of the second mixer that they are respectively 694° C. and 555° C. It is understood from FIG. 25C in the case of the third mixer that they are respectively 750° C. and 500° C. FIG. 25D shows the standard deviation and the difference between the maximum and minimum temperatures with respect to the temperatures of FIGS. 25A–25C. It is understood from FIG. 25D that the standard deviation and the difference between the maximum and minimum temperatures in the case of the first and second mixers are substantially different from those in the case of the third mixer. This means that the first and second mixers make it possible to achieve a more efficient mixing of hydrogen gas and air, as compared with the third mixer. Furthermore, it is understood from FIG. 25D that results of the second mixer are slightly better than those of the first mixer. It should be noted that the results of the first mixer are also enough and acceptable.

If a mixing of hydrogen gas and air is not sufficient, a heat spot may occur when they are introduced into the electric heating catalyst 150. In contrast, according to the third hydrogen combustion heater of the invention, there was no heat spot and a stable hydrogen combustion when hydrogen gas was allowed to flow from the hydrogen introducing pipe 100 at a total flow rate of 50 liters/min and when air was allowed to flow from the blower 11 at a flow rate of 760 liters/min.

Figure 22C:
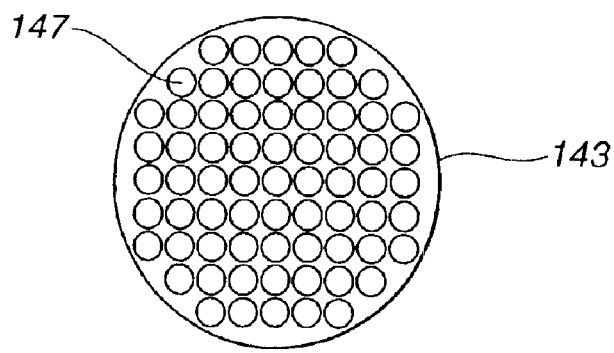

As shown in FIG. 22C, the third member 143 of the mixer 140 disposed in the passage (inner diameter: 58 mm) have the holes 147 (diameter: 6 mm) that is 69 in number. It suffices that the third member 143 has a plurality of holes that is 10 or greater in number, which is about double of the second member, for obtaining a mixing that is in the same level as that of the third member 143 having 69 holes.

Figure 26:
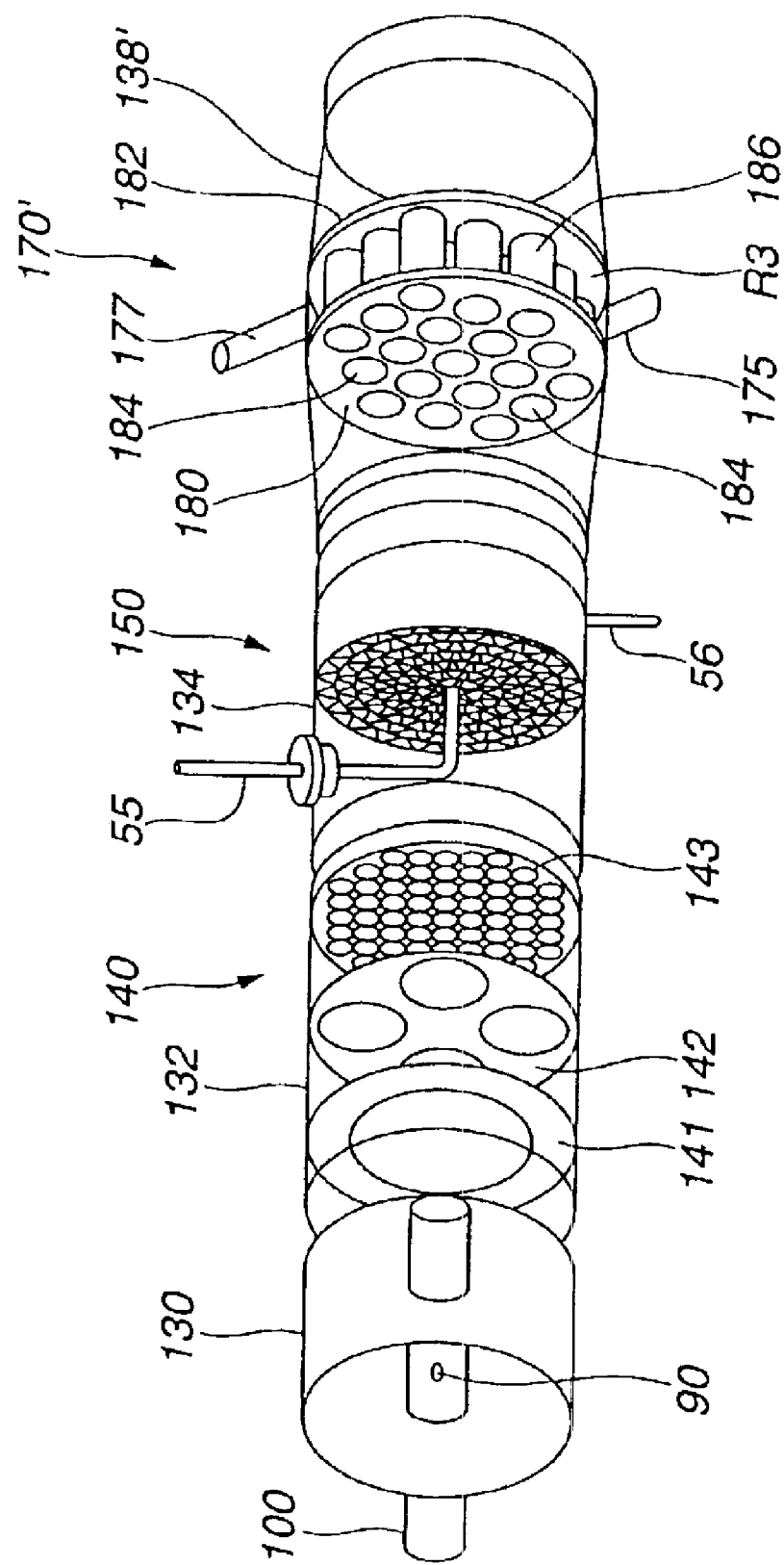
FIG. 26 is a view similar to FIG. 20, but showing a fourth hydrogen combustion heater according to a fourth preferred embodiment of the present invention.

FIG. 26 shows a fourth hydrogen combustion heater according to a fourth preferred embodiment of the invention for a smaller output use, in which the combustion catalyst 160 of the third hydrogen combustion heater is omitted. Thus, a heat exchanger 170' is disposed immediately downstream of the electric heating catalyst 150.

The heat exchanger 170' has a cylindrical shape. In fact, it has a cylindrical casing 138' having a central bulge portion. First and second partition walls 180 and 182 are disposed in and water-tightly attached to the central bulge portion of the casing 138'. Each partition wall has a plurality of holes 184, and each hole 184 of the first partition wall 180 is aligned with the corresponding hole 184 of the second partition wall 182. A plurality of pipes 186 are water-tightly attached to the first and second partition walls 180 and 182 in a manner to connect each hole 184 of the first partition wall 180 with the corresponding hole 184 of the second partition wall 182. In fact, the pipes 186 serve as passages of the combustion gas coming from the electric heating catalyst 150. There is provided a room R3 defined as being a space that is outside of the pipes 186, is inside of the casing 138' and is between the first and second partition walls 180 and 182. Water introducing and discharging pipes 175 and 177 are connected to the room R3 at its diametrical positions. Pure water is allowed to flow through the room R3. The upstream end of the is casing 138' has a diameter that is the same as that of the casing 134 of the electric heating catalyst 150. The other structures of the fourth hydrogen combustion heater are the same as those of the third hydrogen combustion heater.

As stated above, the fourth hydrogen combustion heater has no combustion catalyst. After the electric heating catalyst 150 is heated to 200° C. or higher in this heater, the temperature continues to rise by the catalytic reaction to 500° C.

Therefore, when the required quantity of heat is low (for example, when pure water is allowed to flow through the heat exchanger 170' at a low flow rate) and when hydrogen gas for combustion is in a small amount, it becomes possible to achieve a sufficient combustion of a mixture of hydrogen gas and air only by the electric heating catalyst 150. Thus, the fourth hydrogen combustion heater is preferably used for small output uses.

As compared with the third hydrogen combustion heater, the fourth heater can be compact in size, since the casing of the heat exchanger 170' has a circular section, thereby making the fourth heater have a thin shape.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

The entire disclosure of each of Japanese Patent Applications No. 2000-240816 filed on Aug. 9, 2000, No. 2001-177578 filed on Jun. 12, 2001, and No. 2001-178589 filed on Jun. 13, 2001, including specification, drawings, claims and summary, is incorporated herein by reference in its entirety.

What is claimed is:

1. A method for using a hydrogen combustion heater the heater comprising a passage for allowing hydrogen gas and air to flow therethrough: a first electric heating catalyst provided in said passage, said first catalyst being heated, when electricity is applied thereto, thereby starting a first combustion of a first mixture of said hydrogen gas and said air in said first catalyst; and a heat exchanger provided downstream of said first catalyst in said passage, said heat exchanger being adapted to transfer heat generated by said first combustion to a heating medium of said heat exchanger, said method comprising:

controlling a flow rate ratio of said air to said hydrogen gas, thereby limiting said first combustion to a mild oxidation that is defined as being free from firing of said hydrogen gas.

2. A method according to claim 1, wherein temperature of said first catalyst is limited to 500° C. or lower.

3. A method of providing heat with a hydrogen combustion heater, the method comprising:

flowing hydrogen gas and air through a passage to a first electric heating catalyst provided in said passage;

applying electricity to said first catalyst to heat said first catalyst, thereby starting a first combustion of a first mixture of said hydrogen gas and said air in said first catalyst; and transferring heat generated by said first combustion to a heating medium of a heat exchanger positioned downstream of said first catalyst in said passage.

* * * * *